United States Patent
Honda et al.

(10) Patent No.: US 11,774,872 B2
(45) Date of Patent: Oct. 3, 2023

(54) TONER BINDER

(71) Applicant: SANYO CHEMICAL INDUSTRIES, LTD., Kyoto (JP)

(72) Inventors: Masaru Honda, Kyoto (JP); Satoshi Yamada, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 44 days.

(21) Appl. No.: 17/053,509

(22) PCT Filed: Apr. 12, 2019

(86) PCT No.: PCT/JP2019/016004
§ 371 (c)(1),
(2) Date: Nov. 6, 2020

(87) PCT Pub. No.: WO2019/225207
PCT Pub. Date: Nov. 28, 2019

(65) Prior Publication Data
US 2021/0132518 A1    May 6, 2021

(30) Foreign Application Priority Data
May 22, 2018 (JP) ................................. 2018-097499

(51) Int. Cl.
| G03G 9/087 | (2006.01) |
| G03G 9/08 | (2006.01) |
| C08F 220/18 | (2006.01) |
| C08F 212/10 | (2006.01) |
| C08G 63/195 | (2006.01) |

(52) U.S. Cl.
CPC ........ *G03G 9/08711* (2013.01); *C08F 212/10* (2013.01); *C08F 220/1818* (2020.02); *C08G 63/195* (2013.01); *G03G 9/0821* (2013.01); *G03G 9/08755* (2013.01); *G03G 9/08795* (2013.01); *G03G 9/08797* (2013.01)

(58) Field of Classification Search
CPC ............. G03G 9/08711; G03G 9/0821; G03G 9/08755; G03G 9/08795; G03G 9/08797
See application file for complete search history.

(56) References Cited

U.S. PATENT DOCUMENTS

| 5,955,233 A | 9/1999 | Urashima et al. |
| 2013/0017481 A1 | 1/2013 | Maehata et al. |
| 2014/0099578 A1 | 4/2014 | Hotta et al. |
| 2015/0177635 A1* | 6/2015 | Fukudome ............. G03G 9/081 430/109.4 |
| 2017/0184990 A1 | 6/2017 | Utsui et al. |

FOREIGN PATENT DOCUMENTS

| CN | 104428718 | 3/2015 |
| EP | 2 258 748 | 12/2010 |
| JP | 6-148936 | 5/1994 |
| JP | 2005-77930 | 3/2005 |
| JP | 2005-308995 | 11/2005 |
| JP | 2007-193069 | 8/2007 |
| JP | 2010-132851 | 6/2010 |
| JP | 2011-197193 | 10/2011 |
| JP | 2012-98719 | 5/2012 |
| JP | 2013-24920 | 2/2013 |
| JP | 2013-228724 | 11/2013 |
| JP | 2014-80586 | 5/2014 |
| JP | 2015-11316 | 1/2015 |
| JP | 2015-78352 | 4/2015 |
| JP | 2015-135485 | 7/2015 |
| JP | 2016-110150 | 6/2016 |
| JP | 2017-3985 | 1/2017 |
| JP | 2017-167447 | 9/2017 |
| WO | 97/07431 | 2/1997 |
| WO | 2015/170705 | 11/2015 |
| WO | WO-2015170705 A1 * | 11/2015 ........... G03G 9/0819 |

OTHER PUBLICATIONS

English Machine Translation of the description of WO-2015170705-A1 (Year: 2022).*
International Search Report dated Jun. 11, 2019 in International (PCT) Application No. PCT/JP2019/016004 with English-language translation.

* cited by examiner

*Primary Examiner* — Peter L Vajda
*Assistant Examiner* — Boone Alexander Evans
(74) *Attorney, Agent, or Firm* — WENDEROTH, LIND & PONACK, L.L.P.

(57) ABSTRACT

An object of the present invention is to provide a toner binder that maintains low-temperature fixability and hot offset resistance while having excellent grindability, image strength, heat-resistant storage stability, electrostatic charge stability, gloss-imparting properties, and durability. The toner binder of the present invention contains an amorphous resin (A) and a crystalline vinyl resin (B), wherein a weight ratio [(A)/(B)] of the amorphous resin (A) to the crystalline vinyl resin (B) is 81/19 to 97/3, the toner binder has an endothermic peak top temperature (Tm) derived from the crystalline vinyl resin (B) of 40° C. to 100° C. and a half-width of the endothermic peak derived from the crystalline vinyl resin (B) of 6° C. or less, the crystalline vinyl resin (B) has an acid value of 60 mg KOH/g or less, and the toner binder satisfies the following relation (1): 3° C.≤Tfb (A)−Tfb(C)≤30° C.

5 Claims, No Drawings

TONER BINDER

TECHNICAL FIELD

The present invention relates to a toner binder.

BACKGROUND ART

Recent advancement in electrophotographic systems has brought a rapid increase in demand for electrophotographic devices such as copy machines and laser printers and has also created the need for higher performance of these devices.

According to conventionally known methods and devices for full color electrophotographic images, an image is obtained by forming a latent image based on color image information on a latent image carrier such as an electrophotographic photoreceptor; developing a toner image using color toners corresponding to the colors of the latent image; and transferring the toner image to a transfer material. This image formation process is performed repeatedly. Then, the toner image on the transfer material is thermally fixed to produce a multicolor image.

For these processes to run smoothly, first, the toner is required to maintain a stable electrostatic charge level, and second, the toner is required to have good fixability to paper. In addition, the devices include heating elements in their fixing sections, and these heating elements raise the temperature in the devices, so that the toner is also required not to cause blocking in the devices.

There are also strong demands for further miniaturization, faster processing, and better image quality performance of the electrophotographic devices, as well as for improved low-temperature fixability of the toner in order to reduce the amount of energy consumption in a fixing step for energy saving.

In addition, recently used transfer materials include various types of paper including recycled paper with a rough surface and coated paper with a smooth surface. In order to handle surface properties of these transfer materials, fixing devices with a large nip width, such as soft rollers and belt rollers, are preferably used. However, a larger nip width results in an increased contact area between the toner and fixing rollers. This causes "high-temperature offset phenomenon" in which the fused toner is attached to the fixing rollers. Thus, hot offset resistance is a prerequisite.

In addition to the above, much higher gloss is required for multicolor images (full color images) than black-and-white images (monochrome images) due to processes such as reproduction of photo images. It is necessary to ensure that the resultant multicolor images have a smooth toner layer.

Thus, the toner is required to exert low-temperature fixability while having high gloss-imparting properties and maintaining hot offset resistance, and is increasingly required to be capable of forming a highly glossy toner image that can be obtained in a wider working range.

Toner binders greatly affect toner properties mentioned above. While known resins for toner binders include polystyrene resin, styrene-acrylic resin, polyester resin, epoxy resin, polyurethane resin, and polyamide resin, polyester resin has particularly attracted attention in recent years because polyester resin makes it easy to balance storage stability and fixability.

As a common means to lower the fixing temperature of the toner, a technique to lower the glass-transition temperature of a binder resin (also known as toner binder) is used in general.

However, too low a glass-transition temperature results in low hot offset resistance. It also results in low storage stability of the toner due to likeliness of powder aggregation (blocking). The glass-transition temperature is a design point of the binder resin, and the method of lowering the glass-transition temperature cannot produce a toner that can be fixed at a lower temperature.

Under such a circumstance, toner compositions containing a polyester-based toner binder and having excellent low-temperature fixability are known (see Patent Literatures 1 and 2). However, there has been an increasing demand in recent years for balance between heat-resistant storage stability, low-temperature fixability, and hot offset resistance (fixing temperature range), and the demand is yet to be fully satisfied.

Other known methods include one that uses a mixture of an amorphous resin and a crystalline resin as a binder resin so as to improve the low-temperature fixability and gloss-imparting properties of the toner owing to melting characteristics of the crystalline resin.

However, increasing the amount of the crystalline resin may decrease the strength of the resin. In addition, the crystalline resin becomes amorphous because the crystalline resin and the amorphous resin are compatibilized with each other during melt-kneading, resulting in a low glass-transition temperature of the toner. This causes the same problem as described above in the hot offset resistance and heat-resistant storage stability of the toner.

Suggested countermeasures include a method of reproducing the crystallinity of a crystalline resin by heating after melt-kneading (Patent Literature 3), and a method of reproducing the crystallinity by using a C8-C62 long chain monoalcohol or long chain monocarboxylic acid as a component of a crystalline polyester (Patent Literature 4).

While these methods can provide a toner having low-temperature fixability and gloss-imparting properties, the toner has poor hot offset resistance, flowability, and grindability during grinding, and has particularly insufficient durability.

Suggested countermeasures also include a method of coating a resin particle (a core) containing a crystalline resin obtained by a dissolution suspension method or an emulsion aggregation method with a shell layer (Patent Literature 5). However, the crystalline resin is compatibilized with an amorphous resin of the core, failing to achieve sufficient redeposition of crystals in a short time. Thus, the method fails to provide sufficient image strength after fixing.

Meanwhile, use of a toner containing a polyester resin whose components include an unsaturated carboxylic acid has been suggested as a method of expanding the fixing temperature range (Patent Literature 6).

However, although this method can prevent an offset phenomenon at a high temperature, the lower limit of the fixing temperature is insufficient. Thus, the demand for faster processing and further energy saving is yet to be satisfied.

In other suggested methods, a crystalline vinyl resin is used to improve the low-temperature fixability (Patent Literatures 7 to 10), but at least one of hot offset resistance, electrostatic charge stability, image strength, or durability is insufficient.

CITATION LIST

Patent Literatures

Patent Literature 1: JP 2005-77930 A
Patent Literature 2: JP 2012-98719 A

Patent Literature 3: JP 2005-308995 A
Patent Literature 4: WO 2015/170705
Patent Literature 5: JP 2011-197193 A
Patent Literature 6: JP 2017-003985 A
Patent Literature 7: JP 2015-011316 A
Patent Literature 8: JP 2013-228724 A
Patent Literature 9: JP 2007-193069 A
Patent Literature 10: JP 2015-135485 A

SUMMARY OF INVENTION

Technical Problem

An object of the present invention is to provide a toner binder that maintains low-temperature fixability and hot offset resistance while having excellent grindability, image strength, heat-resistant storage stability, electrostatic charge stability, gloss-imparting properties, and durability.

Solution to Problem

The present inventors extensively studied to solve above problems, and completed the present invention.

Specifically, the toner binder of the present invention contains an amorphous resin (A) and a crystalline vinyl resin (B), wherein a weight ratio [(A)/(B)] of the amorphous resin (A) to the crystalline vinyl resin (B) is 81/19 to 97/3, the toner binder has an endothermic peak top temperature (Tm) derived from the crystalline vinyl resin (B) of 40° C. to 100° C. and a half-width of the endothermic peak derived from the crystalline vinyl resin (B) of 6° C. or less, the crystalline vinyl resin (B) has an acid value of 60 mg KOH/g or less, and the toner binder satisfies the following relation (1):

$$3°\ C. \le Tfb(A) - Tfb(C) \le 30°\ C. \quad \text{relation (1):}$$

wherein Tm is the endothermic peak top temperature derived from the crystalline vinyl resin (B) during second heating on a DSC curve obtained by heating the toner binder in a differential scanning calorimeter from 20° C. to 150° C. at 10° C./min for first heating, cooling from 150° C. to 0° C. at 10° C./min, and then heating from 0° C. to 150° C. at 10° C./min for the second heating; Tfb(C) in the relation (1) is the temperature at which the toner binder starts to flow while 1 g of the toner binder used as a sample is heated from 40° C. at 6° C./min with a load of $196.133 \times 10^4$ Pa to measure the outflow of the melted toner binder using a Koka-type flow tester with a die having a diameter of 1 mm and a length of 1 mm; and Tfb(A) is the temperature at which the amorphous resin (A) starts to flow while 1 g of the amorphous resin (A) used as a sample is measured under the same conditions.

Advantageous Effects of Invention

The present invention can provide a toner binder that maintains low-temperature fixability and hot offset resistance while having excellent grindability, image strength, heat-resistant storage stability, electrostatic charge stability, gloss-imparting properties, and durability.

DESCRIPTION OF EMBODIMENTS

The toner binder of the present invention contains an amorphous resin (A) and a crystalline vinyl resin (B), wherein a weight ratio [(A)/(B)] of the amorphous resin (A) to the crystalline vinyl resin (B) is 81/19 to 97/3, the toner binder has an endothermic peak top temperature (Tm) derived from the crystalline vinyl resin (B) of 40° C. to 100° C. and a half-width of the endothermic peak derived from the crystalline vinyl resin (B) of 6° C. or less, the crystalline vinyl resin (B) has an acid value of 60 mg KOH/g or less, and the toner binder satisfies the following relation (1):

$$3°\ C. \le Tfb(A) - Tfb(C) \le 30°\ C. \quad \text{relation (1):}$$

wherein Tm is the endothermic peak top temperature derived from the crystalline vinyl resin (B) during second heating on a DSC curve obtained by heating the toner binder in a differential scanning calorimeter from 20° C. to 150° C. at 10° C./min for first heating, cooling from 150° C. to 0° C. at 10° C./min, and then heating from 0° C. to 150° C. at 10° C./min for the second heating; Tfb(C) in the relation (1) is the temperature at which the toner binder starts to flow while 1 g of the toner binder used as a sample is heated from 40° C. at 6° C./min with a load of $196.133 \times 10^4$ Pa to measure the outflow of the melted toner binder using a Koka-type flow tester with a die having a diameter of 1 mm and a length of 1 mm; and Tfb(A) is the temperature at which the amorphous resin (A) starts to flow while the amorphous resin (A) (1 g) used as a sample is measured under the same conditions.

The following sequentially describes the toner binder of the present invention.

The toner binder of the present invention contains the amorphous resin (A) as an essential component. The amorphous resin (A) may have any composition as long as it is an amorphous resin. In the present invention, the term "amorphous" means that a sample shows no endothermic peak top temperature when the transition temperature is measured using a differential scanning calorimeter (DSC).

Examples of the amorphous resin (A) include an amorphous polyester resin (A1), an amorphous vinyl resin (A2), an amorphous epoxy resin (A3), and an amorphous urethane resin (A4) Of these, the amorphous resin (A) is preferably the amorphous polyester resin (A1) in terms of image strength and durability. These amorphous resins (A) may be used alone or in combination of two or more thereof.

The amorphous polyester resin (A1) may have any composition as long as it contains an alcohol component (x) and a carboxylic acid component (y) as constituent monomers.

These amorphous polyester resins (A1) may be used alone or in combination of two or more thereof.

Examples of the alcohol component (x) of the amorphous polyester resin (A1) include monools, diols, and tri- to octa- or higher hydric polyols.

These may be used alone or in combination of two or more thereof.

Examples of the monools include C1-C30 straight or branched chain alkyl alcohols (e.g., methanol, ethanol, isopropanol, 1-decanol, dodecyl alcohol, myristyl alcohol, cetyl alcohol, stearyl alcohol, arachidyl alcohol, behenyl alcohol, and lignoceryl alcohol).

Preferred among these monools are C8-C24 straight or branched chain alkyl alcohols, more preferred are C8-C24 straight chain alkyl alcohols, and still more preferred are dodecyl alcohol, stearyl alcohol, arachidyl alcohol, behenyl alcohol, and lignoceryl alcohol, in terms of image strength and heat-resistant storage stability.

Examples of the diols include C2-C12 alkylene glycols (ethylene glycol, 1,4-butanediol, 1,6-hexanediol, 1,8-octanediol, 1,10-decanediol, 1,12-dodecanediol, 1,2-propylene glycol (propylene glycol), 1,2-butanediol, 1,2-pentanediol, 1,2-hexanediol, 1,2-heptanediol, 1,2-octanediol, 1,2-nonanediol, and 1,2-decanediol); C4-C36 alkylene ether glycols (e.g., diethylene glycol, triethylene glycol, dipropylene glycol, polyethylene glycol, polypropylene glycol, and polytetramethylene ether glycol); C4-C36 alicyclic diols (e.g., 1,4-cyclohexanedimethanol and hydrogenated bisphenol A); adducts (the number of moles added is 1 to 30) of alkylene oxides (hereinafter, abbreviated as AO; ethylene oxide as EO; propylene oxide as PO; and butylene oxide as BO) with the alicyclic diols; adducts (the number of moles added is 2 to 30) of AO (e.g., EO, PO, or BO) with bisphenols (e.g., bisphenol A, bisphenol F, and bisphenol S); polylactone diols (e.g., poly(ε-caprolactone) diol); and polybutadiene diols.

Examples of the tri- to octa- or higher hydric polyols include alkane polyols and intramolecular or intermolecular dehydrated products thereof (e.g., glycerol, trimethylolethane, trimethylolpropane, pentaerythritol, sorbitol, sorbitan, and polyglycerin), sugars and derivatives thereof (e.g., sucrose and methyl glucoside), adducts (preferably, the number of moles added is 2 to 30) of AO with trisphenols (e.g., trisphenol PA), adducts (preferably, the number of moles added is 2 to 30) of AO with novolac resins (e.g., phenol novolac and cresol novolac), and acrylic polyols (e.g., copolymers of hydroxyethyl (meth)acrylate and other vinyl monomers).

Preferred among the alcohol components (x) are adducts (the number of moles added is 2 to 3) of AO with bisphenols, ethylene glycol, 1,2-propylene glycol, and 1,4-butanediol, in terms of low-temperature fixability, hot offset resistance, and heat-resistant storage stability. Adducts of AO with bisphenols are preferably adducts (the number of moles of AO added is 2 to 3) of EO and/or PO with bisphenols, more preferably adducts (the number of moles of AO added is 2 to 3) of EO and/or PO with bisphenol A.

Examples of the carboxylic acid component (y) of the amorphous polyester resin (A1) include monocarboxylic acids, dicarboxylic acids, tri- to hexa- or higher valent polycarboxylic acids, and anhydrides or lower alkyl (C1-C4) esters (e.g., methyl ester, ethyl ester, and isopropyl ester) of these acids.

These may be used alone or in combination of two or more thereof.

Examples of the monocarboxylic acids include C7-C37 (including carbon atoms of the carbonyl group) aromatic monocarboxylic acids (e.g., benzoic acid, toluic acid, 4-ethylbenzoic acid, and 4-propylbenzoic acid), C2-C50 aliphatic monocarboxylic acids (e.g., acetic acid, propionic acid, butyric acid, valeric acid, caproic acid, enanthic acid, caprylic acid, pelargonic acid, capric acid, lauric acid, myristic acid, palmitic acid, margaric acid, stearic acid, behenic acid, (meth)acrylic acid (the term "(meth)acrylic" means acrylic or methacrylic), crotonic acid, isocrotonic acid, and cinnamic acid).

Preferred among these monocarboxylic acid components are C7-C17 aromatic monocarboxylic acids and C12-C30 aliphatic monocarboxylic acids, and more preferred are benzoic acid, stearic acid, behenic acid, and combinations of two or more thereof, in terms of image strength and heat-resistant storage stability. The monocarboxylic acid components may also be anhydrides or lower alkyl esters of these acids.

Examples of the dicarboxylic acids include C2-C50 alkane dicarboxylic acids (e.g., alkane dicarboxylic acids having carboxyl groups at both ends of an acyclic saturated hydrocarbon group, such as succinic acid, adipic acid, sebacic acid, azelaic acid, dodecanedioic acid, and 1,18-octadecane dicarboxylic acid, and alkane dicarboxylic acids having a carboxyl group at a site other than the ends of an acyclic saturated hydrocarbon group, such as decyl succinic acid); C4-C50 alkene dicarboxylic acids (e.g., alkenyl succinic acids such as dodecenyl succinic acid, pentadecenyl succinic acid, and octadecenyl succinic acid, maleic acid, fumaric acid, and citraconic acid); C6-C40 alicyclic dicarboxylic acids (e.g., dimer acids (dimerized linoleic acid)); and C8-C36 aromatic dicarboxylic acids (e.g., phthalic acid, isophthalic acid, terephthalic acid, t-butylisophthalic acid, 2,6-naphthalene dicarboxylic acid, and 4,4'-biphenyl dicarboxylic acid).

Examples of the tri- to hexa- or higher valent polycarboxylic acids include C9-C20 aromatic polycarboxylic acids (e.g., trimellitic acid and pyromellitic acid), C6-C36 aliphatic tricarboxylic acids (e.g., hexanetricarboxylic acid), and vinyl polymers of unsaturated carboxylic acids (number average molecular weight (Mn): 450 to 10000) (e.g., styrene/maleic acid copolymers, styrene/(meth)acrylic acid copolymers, and styrene/fumaric acid copolymers).

Preferred among the carboxylic acid components (y) are C7-C36 aromatic monocarboxylic acids (e.g., benzoic acid), C8-C36 aromatic dicarboxylic acids (e.g., phthalic acid, isophthalic acid, terephthalic acid, t-butylisophthalic acid, 2,6-naphthalene dicarboxylic acid, and 4,4'-biphenyl dicarboxylic acid), C2-C50 alkane dicarboxylic acids (e.g., adipic acid), C4-C50 alkene dicarboxylic acids (e.g., fumaric acid), tri- to hexa- or higher valent C9-C20 aromatic polycarboxylic acids (e.g., trimellitic acid and pyromellitic acid), and combinations of two or more thereof, in terms of low-temperature fixability, hot offset resistance, and heat-resistant storage stability. More preferred are C7-C36 aromatic monocarboxylic acids, C8-C36 aromatic dicarboxylic acids, C2-C50 alkane dicarboxylic acids, tri- to hexa- or higher valent C9-C20 aromatic polycarboxylic acids, and combinations of two or more thereof. The carboxylic acid components (y) may be anhydrides or lower alkyl esters of these acids.

In order to obtain an amorphous resin, the amount of the C2-C12 alkylene glycol (straight chain aliphatic diol) is preferably 70 mol % or less, more preferably 60 mol % or less, of the diol components to be used. Preferably, the alcohol component (x) constituting the amorphous polyester resin (A1) contains 90 to 100 mol % diol components.

In the present invention, the amorphous polyester resin (A1) can be produced by the same method used to produce known polyesters.

For example, the amorphous polyester resin (A1) can be produced by reacting components in an inert gas (e.g., nitrogen gas) atmosphere, preferably at a reaction temperature of 150° C. to 280° C., more preferably 160° C. to 250° C., still more preferably 170° C. to 235° C. In order to ensure completion of the polycondensation reaction, the reaction time is preferably 30 minutes or longer, more preferably 2 to 40 hours.

At this time, an esterification catalyst can be used, if necessary. Examples of the esterification catalyst include tin-containing catalysts (e.g., dibutyl tin oxide), antimony trioxide, titanium-containing catalysts, zirconium-containing catalysts (e.g., zirconium acetate), and zinc acetate. Examples of the titanium-containing catalysts include titanium alkoxide, potassium oxalate titanate, titanium terephthalate, titanium terephthalate alkoxide, catalysts described in JP 2006-243715 A (e.g., titanium dihydroxy bis(triethanolaminate), titanium monohydroxy tris(triethanolaminate), titanyl bis(triethanolaminate), and intramolecular polycondensation products thereof), and catalysts described in JP 2007-11307 A (e.g., titanium tributoxy terephthalate, titanium triisopropoxy terephthalate, and titanium diisopropoxy diterephthalate). Preferred among these are titanium-containing catalysts. Pressure reduction is also effective in increasing the rate of reaction in the final stage of the reaction.

In addition, a stabilizer may be added in order to stabilize the polyester polymerization. Examples of the stabilizer include hydroquinone, methyl hydroquinone, and hindered phenolic compounds.

The feed ratio of the alcohol component (x) to the carboxylic acid component (y), as an equivalent ratio of hydroxyl group to carboxyl group [OH]/[COOH], is preferably 2/1 to 1/2, more preferably 1.5/1 to 1/1.3, still more preferably 1.4/1 to 1/1.2. The hydroxyl group is the sum of hydroxyl groups derived from the alcohol component (x), and the carboxyl group is the sum of carboxyl groups derived from the carboxylic acid component (y).

Examples of the amorphous vinyl resin (A2) include styrene homopolymers, copolymers of a styrene monomer and a (meth)acrylic monomer, resins in which a styrene homopolymer is bonded to the amorphous polyester resin (A1), and resins in which a copolymer of a styrene monomer and a (meth)acrylic monomer is bonded to the amorphous polyester resin (A1).

Examples of the styrene monomers include styrene and alkylstyrene in which the alkyl group has 1 to 3 carbon atoms (e.g., α-methylstyrene and p-methylstyrene). Styrene is preferred. These monomers may be used alone or in combination of two or more thereof.

Examples of the (meth)acrylic monomers include alkyl esters in which the alkyl group has 1 to 16 carbon atoms, such as methyl (meth)acrylate, ethyl (meth)acrylate, butyl (meth)acrylate, 2-ethylhexyl (meth)acrylate, lauryl (meth)acrylate, and stearyl (meth)acrylate; hydroxy group-containing (meth)acrylates in which the alkyl group has 1 to 16 carbon atoms, such as hydroxyethyl (meth)acrylate; amino group-containing (meth)acrylates in which the alkyl group has 1 to 16 carbon atoms, such as dimethylaminoethyl (meth)acrylate and diethylaminoethyl (meth)acrylate; and (meth)acrylic acid. In the present invention, the term "(meth)acrylate" means "acrylate" and/or "methacrylate".

Preferred among these are methyl (meth)acrylate, ethyl (meth)acrylate, butyl (meth)acrylate, 2-ethylhexyl (meth)acrylate, and (meth)acrylic acid. These monomers may be used alone or in combination of two or more thereof.

The amorphous vinyl resin (A2) may contain one or more other vinyl ester monomers, aliphatic hydrocarbon vinyl monomers, and/or nitrile-group containing monomers, if necessary.

Examples of the vinyl ester monomers include aliphatic vinyl esters (those having 4 to 15 carbon atoms, such as vinyl acetate, vinyl propionate, and isopropenyl acetate), esters of unsaturated carboxylic acids and polyhydric (dihydric or trihydric) alcohols (those having 8 to 200 carbon atoms, such as multifunctional (meth)acrylates (e.g., ethylene glycol di(meth)acrylate, propylene glycol di(meth)acrylate, neopentyl glycol di(meth)acrylate, trimethylolpropane tri(meth)acrylate, and 1,6-hexanediol di(meth)acrylate, and polyethylene glycol di(meth)acrylate)), and aromatic vinyl esters (those having 9 to 15 carbon atoms, such as methyl-4-vinyl benzoate).

Examples of the aliphatic hydrocarbon vinyl monomers include olefins (those having 2 to 10 carbon atoms, such as ethylene, propylene, butene, and octene), and dienes (those having 4 to 10 carbon atoms, such as butadiene, isoprene, and 1,6-hexadiene).

Examples of the nitrile-group containing monomers include acrylonitrile, methacrylonitrile, and those in which the methyl group of methacrylonitrile is replaced by a C2-C16 alkyl group.

These monomers may be used alone or in combination of two or more thereof.

Preferably, two or more amorphous vinyl resins (A2) having different molecular weights are used in combination in terms of fixing temperature range.

In the present invention, the amorphous polyester resin (A2) can be produced by the same method used to produce known vinyl resins.

The polymerization rate of the amorphous vinyl resin (A2) is preferably 98% or more, more preferably 98.5% or more, still more preferably 99% or more, particularly preferably 99.5% or more, in terms of storage stability.

The polymerization rate of the amorphous vinyl resin (A2) can be determined by the following method. The case where a styrene monomer is used is described as an example.

Device: GC-14A available from Shimadzu Corporation
Column: 20% PEG-20 M glass column (2 m) packed with chromosorb W (Phenomenex)
Internal standard: amyl alcohol
Detector: FID detector
Column temperature: 100° C.
Sample concentration: 5% solution in DMF Calibration curves of styrene and amyl alcohol are created in advance, and the amount of styrene monomer in the sample is determined based on the calibration curves. The polymerization rate is calculated from the amount of residual styrene monomer relative to the amount fed. The sample is dissolved in dimethylformamide (DMF) to a concentration of 5 wt %, followed by standing for 10 minutes. The supernatant is used as a sample solution.

Examples of the amorphous epoxy resin (A3) include ring-opening polymers of polyepoxide, polyadducts of polyepoxide with an active hydrogen-containing compound (e.g., water, a polyol (diol, triol, or higher polyol), a dicarboxylic acid, a tri- or higher valent polycarboxylic acid, or a polyamine), resins in which a ring-opening polymer of polyepoxide is bonded to the amorphous polyester resin (A1), and resins in which a polyadduct of polyepoxide with an active hydrogen-containing compound is bonded to the amorphous polyester resin (A1).

Examples of the amorphous urethane resin (A4) include those obtained by reaction of a monoisocyanate (v1), a diisocyanate (v2), and/or a tri- or higher functional polyisocyanate (v3) with the amorphous polyester resin (A1), in the presence of a chain extender (e.g., diamine), if necessary.

Examples of the monoisocyanate (v1) include phenyl isocyanate, tolylene isocyanate, xylylene isocyanate, α,α, α',α'-tetramethylxylylene isocyanate, naphthylene isocyanate, ethyl isocyanate, propyl isocyanate, hexyl isocyanate, octyl isocyanate, decyl isocyanate, dodecyl isocyanate, tetradecyl isocyanate, hexadecyl isocyanate, octadecyl isocyanate, cyclobutyl isocyanate, cyclohexyl isocyanate, cyclooctyl isocyanate, cyclodecyl isocyanate, cyclododecyl isocyanate, cyclotetradecyl isocyanate, isophorone isocyanate, dicyclohexylmethane-4-isocyanate, cyclohexylene isocyanate, methylcyclohexylene isocyanate, norbornane isocyanate, and bis(2-isocyanatoethyl)-4-cyclohexene-1,2-dicarboxylate.

Examples of the diisocyanate (v2) include aliphatic diisocyanate compounds (e.g., trimethylene diisocyanate, tetramethylene diisocyanate, hexamethylene diisocyanate, pentamethylene diisocyanate, 1,2-propylene diisocyanate, 1,3-butylene diisocyanate, dodecamethylene diisocyanate, and 2,4,4-trimethylhexamethylene diisocyanate), alicyclic diisocyanate compounds (e.g., 1,3-cyclopentene diisocyanate, 1,3-cyclohexane diisocyanate, 1,4-cyclohexane diisocyanate, isophorone diisocyanate, hydrogenated diphenylmethane diisocyanate, hydrogenated xylylene diisocyanate, hydrogenated tolylene diisocyanate, and hydrogenated tetramethylxylylene diisocyanate), and aromatic diisocyanate compounds (e.g., phenylene diisocyanate, 2,4-tolylene diisocyanate, 2,6-tolylene diisocyanate, 2,2'-diphenylmethane diisocyanate, 4,4'-diphenylmethane diisocyanate, 4,4'-toluidine diisocyanate, 4,4'-diphenylether diisocyanate, 4,4'-diphenyl diisocyanate, 1,5-naphthalene diisocyanate, and xylylene diisocyanate).

The tri- or higher functional polyisocyanate (v3) is not limited as long as it is a compound having three or more isocyanate groups. Examples thereof include compounds having a chemical structure of triisocyanate, tetraisocyanate, isocyanurate, or biuret.

In the toner binder of the present invention, the weight average molecular weight of the amorphous resin (A) is preferably 5000 to 200000, more preferably 20000 to 180000, still more preferably 30000 to 150000.

A weight average molecular weight of 5000 to 200000 results in good gloss-imparting properties, low-temperature fixability, and hot offset resistance. The weight average molecular weight is determined by gel permeation chromatography (GPC).

In the toner binder of the present invention, the peak top molecular weight Mp of the amorphous resin (A) as measured by gel permeation chromatography (GPC) is preferably 2000 to 30000, more preferably 3000 to 20000, still more preferably 4000 to 12000.

A peak top molecular weight Mp of 2000 to 30000 results in good gloss-imparting properties, low-temperature fixability, and hot offset resistance.

Here, a calculation method of the peak top molecular weight Mp is described.

First, a calibration curve is produced by gel permeation chromatography (GPC) using standard polystyrene samples.

Next, a sample is fractionated by GPC, and the value of count of the fractionated sample is measured in each retention time.

Then, a molecular weight distribution chart of the sample is made from logarithmic values of the calibration curve and the count. A peak maximum value in the molecular weight distribution chart is the peak top molecular weight Mp.

When there are multiple peaks in the molecular weight distribution chart, the maximum value among these peaks is the peak top molecular weight Mp. GPC measurement conditions are as follows.

In the present invention, the peak top molecular weight Mp, the number average molecular weight (hereinafter may be abbreviated as "Mn"), and the weight average molecular weight (hereinafter may be abbreviated as "Mw") of the amorphous resin (A) can be measured by GPC under the following conditions.

Device (an example): HLC-8120 available from Tosoh Corporation
Column (an example): TSK GEL GMH6, two columns (Tosoh Corporation)
Measurement temperature: 40° C.
Sample solution: 0.25 wt % solution in THF
Amount of solution to be injected: 100 μL
Detection device: refractive index detector
Reference substance: standard polystyrene available from Tosoh Corporation (TSK standard polystyrene), 12 samples (molecular weight: 500, 1050, 2800, 5970, 9100, 18100, 37900, 96400, 190000, 355000, 1090000, and 2890000)

For the measurement of the molecular weight, the sample is dissolved in tetrahydrofuran (THF) to a concentration of 0.25 wt % and insolubles are filtered out by a glass filter to obtain a sample solution.

In the toner binder of the present invention, preferably, the Tfb(A) indicating the flow starting temperature of the amorphous resin (A) is 55° C. to 115° C. in terms of low-temperature fixability and heat-resistant storage stability. The Tfb(A) is more preferably 60° C. to 110° C., still more preferably 65° C. to 105° C., particularly preferably 70° C. to 100° C. The Tfb(A) can be decreased by, for example, decreasing the glass-transition temperature, weight average molecular weight, and/or cohesive force of the amorphous resin (A).

The method of measuring the Tfb(A) is described.

The amorphous resin (A) (1 g) used as a sample is heated from 40° C. at 6° C./min with a load of $196.133 \times 10^4$ Pa, using a Koka-type flow tester with a die having a diameter of 1 mm and a length of 1 mm to measure the outflow of the melted amorphous resin (A). During the measurement, the temperature at which the amorphous resin (A) starts to flow, i.e., the temperature at which piston stroke starts to increase again after it increased slightly due to thermal expansion of the sample, is determined as the Tfb(A).

In the toner binder of the present invention, preferably, the flow softening point (T1/2) of the amorphous resin (A) is 85° C. to 155° C. in terms of low-temperature fixability and hot offset. The flow softening point (T1/2) is more preferably 90° C. to 150° C., still more preferably 95° C. to 145° C., particularly preferably 100° C. to 140° C.

The method of measuring the flow softening point (T1/2) is described.

Using a Koka-type flow tester (for example, CFT-500D available from Shimadzu Corporation), 1 g of a measurement sample is pushed through a nozzle having a diameter of 1 mm and a length of 1 mm by application of a load of 1.96 MPa by a plunger while the measurement sample is heated at a heating rate of 6° C./min. A graph of "plunger descending amount (flow value)" against "temperature" is plotted, and the temperature corresponding to ½ of the maximum plunger descending amount is determined as the flow softening point (T1/2).

Preferably, the SP(A) indicating the solubility parameter (SP value) of the amorphous resin (A) is 10.6 to 11.9 $(cal/cm^3)^{0.5}$ in terms of low-temperature fixability, heat-resistant storage stability, and grindability. The SP(A) can be decreased by, for example, decreasing the acid value, hydroxyl value, cohesive force of the amorphous resin (A), and/or increasing the weight average molecular weight of the amorphous resin (A).

The SP value $(cal/cm^3)^{0.5}$ in the present invention is a value calculated as 25° C. by the method disclosed by Robert F. Fedors et al., Polymer Engineering & Science, 1974, vol. 14, pp. 151-154.

Preferably, the glass-transition temperature (Tg) of the amorphous resin (A) is 45° C. to 80° C.

A Tg of 80° C. or lower results in good low-temperature fixability. A Tg of 45° C. or higher results in good heat-resistant storage stability. The glass-transition temperature (Tg) of the amorphous resin (A) is more preferably 48° C. to 75° C., still more preferably 50° C. to 70° C., particularly preferably 52° C. to 65° C.

The glass-transition temperature (Tg) can be measured using, for example, DSC Q20 available from TA Instruments by the method (DSC method) prescribed in ASTM D3418-82. Glass-transition temperature measurement conditions are described below.

<Measurement Conditions>
(1) Temperature is increased from 30° C. to 150° C. at 20° C./min.
(2) Temperature is maintained at 150° C. for 10 minutes.
(3) Temperature is cooled to −35° C. at 20° C./min.
(4) Temperature is maintained at −35° C. for 10 minutes.
(5) Temperature is increased to 150° C. at 20° C./min.
(6) A curve of differential scanning calorimetry measured during (5) is analyzed.

The acid value of the amorphous resin (A) is preferably 1 to 30 mg KOH/g, more preferably 6 to 22 mg KOH/g.

The acid value of the amorphous resin (A) is preferably 1 mg KOH/g or more in terms of electrostatic charge stability, and is preferably 30 mg KOH/g or less in terms of heat-resistant storage stability.

The hydroxyl value of the amorphous resin (A) is preferably 1 to 50 mg KOH/g, more preferably 23 to 40 mg KOH/g.

The hydroxyl value of the amorphous resin (A) is preferably 1 mg KOH/g or more in terms of low-temperature fixability, and is preferably 50 mg KOH/g or less in terms of heat-resistant storage stability.

The acid value and the hydroxyl value can be measured by the following method.

<Acid Value and Hydroxyl Value>
The method prescribed in JIS K 0070 is used for the measurement. The solvent for measuring the acid value is a mixed solvent of acetone, methanol, and toluene (acetone:methanol:toluene=12.5:12.5:75), and the solvent for measuring the hydroxyl value is THF.

The toner binder of the present invention contains the crystalline vinyl resin (B) as an essential component. The crystalline vinyl resin (B) may have any composition as long as it is a crystalline vinyl resin. In the present invention, the term "crystalline" means that a DSC curve has a distinct endothermic peak top temperature in differential scanning calorimetry (DSC) described below.

The method of measuring the endothermic peak top temperature of the crystalline vinyl resin (B) is described.

A differential scanning calorimeter (e.g., DSC Q20 available from TA Instruments) is used for the measurement. The crystalline vinyl resin (B) is heated from 20° C. to 150° C. at 10° C./min for first heating; cooled from 150° C. to 0° C. at 10° C./min; and then heated from 0° C. to 150° C. at 10° C./min for second heating. The endothermic peak top temperature during the second heating is determined as the endothermic peak top temperature of the crystalline vinyl resin (B).

Preferably, the crystalline vinyl resin (B) is a polymer containing a C21-C40 (meth)acrylate having an acyclic hydrocarbon group (a monomer (a)) as a constituent monomer. Preferably, the crystalline vinyl resin (B) includes, as constituent monomers, the monomer (a), i.e., the C21-C40 (meth)acrylate having a acyclic hydrocarbon group, and at least one monomer (b) selected from the group consisting of a styrene monomer (b1), a (meth)acrylic monomer (b2) other than the monomer (a), a vinyl ester monomer (b3), and an aliphatic hydrocarbon vinyl monomer (b4).

Use of a C21 or higher (meth)acrylate having an acyclic hydrocarbon group as the monomer (a) results in good heat-resistant storage stability. Use of a C40 or lower (meth)acrylate having an acyclic hydrocarbon group as the monomer (a) results in good low-temperature fixability.

Examples of the C21-C40 (meth)acrylate having an acyclic hydrocarbon group include (meth)acrylates having a C18-C36 straight chain alkyl group (e.g., octadecyl (meth)acrylate (stearyl (meth)acrylate), nonadecyl (meth)acrylate, eicosyl (meth)acrylate, arachidyl (meth)acrylate, heneicosyl (meth)acrylate, behenyl (meth)acrylate, lignoceryl (meth)acrylate, ceryl (meth)acrylate, montanyl (meth)acrylate, triacontyl (meth)acrylate, and dotriacontyl (meth)acrylate)) and (meth)acrylates having a C18-C36 branched chain alkyl group (e.g., 2-decyltetradecyl (meth)acrylate).

Preferred among these are (meth)acrylates having a C18-C36 straight chain alkyl group, more preferred are (meth)acrylates having a C18-C30 straight chain alkyl groups, still more preferred are octadecyl (meth)acrylate, arachidyl (meth)acrylate, behenyl (meth)acrylate, lignoceryl (meth)acrylate, ceryl (meth)acrylate, and triacontyl (meth)acrylate, and particularly preferred are octadecyl acrylate, arachidyl acrylate, behenyl acrylate, and lignoceryl acrylate, in terms of balance between heat-resistant storage stability, low-temperature fixability, hot offset resistance, grindability, image strength, and durability of the toner.

These monomers (a) may be used alone or in combination of two or more thereof.

The crystalline vinyl resin (B) may contain, as a constituent monomer, at least one monomer (b) selected from the group consisting of the styrene monomer (b1), the (meth)acrylic monomer (b2) other than the monomer (a), the vinyl ester monomer (b3), and the aliphatic hydrocarbon vinyl monomer (b4), in addition to the monomer (a). The presence of the monomer (b) is preferred in terms of hot offset resistance, electrostatic charge stability, and durability.

Among the monomers (b), examples of the styrene monomer (b1) include styrene and alkylstyrene in which the alkyl group has 1 to 3 carbon atoms (e.g., α-methylstyrene and p-methylstyrene).

Preferred among these is styrene.

Among the monomers (b), examples of the (meth)acrylic monomer (b2) include alkyl (meth)acrylates in which the alkyl group has 1 to 17 carbon atoms, such as methyl (meth)acrylate, ethyl (meth)acrylate, butyl (meth)acrylate, 2-ethylhexyl (meth)acrylate, and lauryl (meth)acrylate; hydroxyalkyl (meth)acrylates in which the alkyl group has 1 to 17 carbon atoms, such as hydroxyethyl (meth)acrylate (2-hydroxyethyl (meth)acrylate); aminoalkyl group-containing (meth)acrylates in which the alkyl group has 1 to 17 carbon atoms, such as dimethylaminoethyl (meth)acrylate and diethylaminoethyl (meth)acrylate; C8-C20 esters of unsaturated carboxylic acids and polyhydric alcohols, such as ethylene glycol di(meth)acrylate, propylene glycol di(meth)acrylate, neopentyl glycol di(meth)acrylate, trimethylolpropane tri(meth)acrylate, 1,6-hexanediol di(meth)acrylate, and polyethylene glycol di(meth)acrylate; and (meth)acrylic acid.

Preferred among there are hydroxyethyl (meth)acrylate, (meth)acrylic acid, and combinations of two or more thereof.

Among the monomers (b), examples of the vinyl ester monomer (b3) include C4-C15 aliphatic vinyl esters (e.g., vinyl acetate, vinyl propionate, and isopropenyl acetate) and C9-C15 aromatic vinyl esters (e.g., methyl-4-vinyl benzoate).

Preferred among these is vinyl acetate.

Among the monomers (b), examples of the aliphatic hydrocarbon vinyl monomer (b4) include C2-C10 olefins (e.g., ethylene, propylene, butene, and octene) and C4-C10 dienes (e.g., butadiene, isoprene, and 1,6-hexadiene).

Preferred among these monomers (b) are styrene, (meth) acrylic acid, hydroxyethyl (meth)acrylate, and vinyl acetate, and more preferred are styrene, (meth)acrylic acid, and vinyl acetate, in terms of low-temperature fixability, heat-resistant storage stability, grindability, and raw material cost.

The crystalline vinyl resin (B) may contain a monomer (d) as a constituent monomer in addition to the monomers (a) and (b). The presence of the monomer (d) is preferred in terms of heat-resistant storage stability and hot offset resistance. The monomer (d) is a monomer other than the monomers (a) and (b) and having at least one functional group selected from the group consisting of a nitrile group, a urethane group, a urea group, an amide group, an imide group, an allophanate group, and a biuret group, and an ethylenically unsaturated bond.

Among the monomers (d), examples of a nitrile group-containing monomer (d1) include acrylonitrile and methacrylonitrile.

Among the monomers (d), examples of a urethane group-containing monomer (d2) include monomers obtained by reacting, by a known method, a C2-C22 alcohol having an ethylenically unsaturated bond (e.g., 2-hydroxyethyl methacrylate or vinyl alcohol) with a C1-C30 isocyanate, and monomers obtained by reacting, by a known method, a C1-C26 alcohol with a C2-C30 isocyanate having an ethylenically unsaturated bond.

Examples of the C1-C30 isocyanate include monoisocyanate compounds (e.g., benzenesulfonyl isocyanate, tosyl isocyanate, phenyl isocyanate, p-chlorophenyl isocyanate, butyl isocyanate, hexyl isocyanate, t-butyl isocyanate, cyclohexyl isocyanate, octyl isocyanate, 2-ethylhexyl isocyanate, dodecyl isocyanate, adamantyl isocyanate, 2,6-dimethylphenyl isocyanate, 3,5-dimethylphenyl isocyanate, and 2,6-dipropylphenyl isocyanate); aliphatic diisocyanate compounds (e.g., trimethylene diisocyanate, tetramethylene diisocyanate, hexamethylene diisocyanate, pentamethylene diisocyanate, 1,2-propylene diisocyanate, 1,3-butylene diisocyanate, dodecamethylene diisocyanate, and 2,4,4-trimethylhexamethylene diisocyanate); alicyclic diisocyanate compounds (e.g., 1,3-cyclopentene diisocyanate, 1,3-cyclohexane diisocyanate, 1,4-cyclohexane diisocyanate, isophorone diisocyanate, hydrogenated diphenylmethane diisocyanate, hydrogenated xylylene diisocyanate, hydrogenated tolylene diisocyanate, and hydrogenated tetramethylxylylene diisocyanate); and aromatic diisocyanate compounds (e.g., phenylene diisocyanate, 2,4-tolylene diisocyanate, 2,6-tolylene diisocyanate, 2,2'-diphenylmethane diisocyanate, 4,4'-diphenylmethane diisocyanate, 4,4'-toluidine diisocyanate, 4,4'-diphenylether diisocyanate, 4,4'-diphenyl diisocyanate, 1,5-naphthalene diisocyanate, and xylylene diisocyanate).

Examples of the C1-C26 alcohol include methanol, ethanol, propanol, isopropyl alcohol, butanol, t-butyl alcohol, pentanol, heptanol, octanol, 2-ethylhexanol, nonanol, decanol, undecyl alcohol, lauryl alcohol, dodecyl alcohol, myristyl alcohol, pentadecyl alcohol, cetanol, heptadecanol, stearyl alcohol, isostearyl alcohol, elaidyl alcohol, oleyl alcohol, linoleyl alcohol, linolenyl alcohol, nonadecyl alcohol, heneicosanol, behenyl alcohol, and erucyl alcohol.

Examples of the C2-C30 isocyanate having an ethylenically unsaturated bond include 2-isocyanatoethyl (meth) acrylate, 2-(0-[1'-methylpropylideneamino]carboxyamino) ethyl (meth)acrylate, 2-[(3,5-dimethylpyrazolyl) carbonylamino]ethyl (meth)acrylate, and 1,1-(bis(meth) acryloyloxymethyl)ethyl isocyanate.

Herein, the carbon number of a compound having an isocyanate group and the carbon number of a structure having an isocyanate group do not include the carbon number of the isocyanate group (NCO).

Among the monomers (d), examples of a urea group-containing monomer (d3) include monomers obtained by reacting, by a known method, a C3-C22 amine (examples of monofunctional amines include primary amines such as normal butylamine, t-butylamine, propylamine, and isopropylamine, secondary amines such as di-normal ethylamine, di-normal propylamine, and di-normal butylamine, aniline, and cyclohexylamine) and a C2-C30 isocyanate having an ethylenically unsaturated bond.

Among the monomers (d), examples of an amide group-containing monomer (d4) include monomers obtained by reacting, by a known method, a C1-C30 amine and a C3-C30 carboxylic acid having an ethylenically unsaturated bond (e.g., acrylic acid or methacrylic acid).

Among the monomers (d), examples of an imide group-containing monomer (d5) include monomers obtained by reacting, by a known method, ammonia and a C4-C10 carboxylic anhydride having an ethylenically unsaturated bond (e.g., maleic anhydride or acrylic anhydride), and monomers obtained by reacting, by a known method, a C1-C30 primary amine and a C4-C10 carboxylic anhydride having an ethylenically unsaturated bond.

Among the monomers (d), examples of an allophanate group-containing monomer (d6) include monomers obtained by reacting, by a known method, the urethane group-containing monomer (b2) and a C1-C30 isocyanate.

Among the monomers (d), examples of a biuret group-containing monomer (d7) include monomers obtained by reacting, by a known method, the urea group-containing monomer (d3) and a C1-C30 isocyanate.

Use of the monomers (d2) to (d7) allows at least one functional group selected from the group consisting of a urethane group, a urea group, an amide group, an imide group, an allophanate group, and a biuret group to be introduced into the crystalline vinyl resin (B).

Other than the method using the monomers (d2) to (d7), the following method can also be used to introduce at least one functional group selected from the group consisting of a urethane group, a urea group, an amide group, an imide group, an allophanate group, and a biuret group into the crystalline vinyl resin (B).

First, between two compounds (one compound having an ethylenically unsaturated bond and the other compound) used to obtain the monomers (d2) to (d7), the compound having an ethylenically unsaturated bond is reacted with the monomer (a) to obtain a polymer. Subsequently, the other compound is reacted with the polymer of the compound having an ethylenically unsaturated bond and the monomer (a). By the above procedure, "the polymer of the compound having an ethylenically unsaturated bond and the monomer (a)" and "the other compound" are bonded together by the above procedure, whereby the crystalline vinyl resin (B) is obtained. During the reaction, "the polymer of the compound having an ethylenically unsaturated bond and the monomer (a)" and "the other compound" are bonded to each other via a urethane group, urea group, amide group, imide group, allophanate group, or biuret group. Thus, at least one functional group selected from the group consisting of a urethane group, a urea group, an amide group, an imide group, an allophanate group, and a biuret group can be introduced into the crystalline vinyl resin (B).

In the case of the above method, the monomer (d) is not used as a monomer to constitute the crystalline vinyl resin (B), but the resulting compound is the same. Thus, for the sake of convenience, the resulting compound is described as one obtained using the monomer (d) or one containing the monomer (d) as a constituent monomer.

Preferred among these monomers (d) are the nitrile group-containing monomer (d1), the urethane group-containing monomer (d2), and the urea group-containing monomer (d3). More preferred are acrylonitrile, methacrylonitrile, and reaction compounds of 2-isocyanatoethyl (meth)acrylate and methanol, and reaction compounds of 2-isocyanatoethyl (meth)acrylate and di-normal butylamine.

The crystalline vinyl resin (B) may contain, as a constituent monomer, an additional monomer other than the monomer (a), the monomer (b), and the monomer (d), and examples thereof include divinylbenzene and sodium alkylallylsulfosuccinate.

Preferably, the crystalline vinyl resin (B) is a polymer containing the monomer (a) as a constituent monomer. The weight percent of the monomer (a) among the monomers constituting the crystalline vinyl resin (B) is preferably 40 wt % or more, more preferably 50 wt % or more, based on the total weight of the monomers constituting the crystalline vinyl resin (B). The crystalline vinyl resin (B) in which the weight percent of the monomer (a) is 40 wt % or more based on the total weight of the monomers constituting the crystalline vinyl resin (B) has excellent crystallinity and thus has good low-temperature fixability.

The weight percent of the monomer (a) among the monomers constituting the crystalline vinyl resin (B) is more preferably 53 to 99 wt %, still more preferably 55 to 97 wt %, particularly preferably 57 to 95 wt %, most preferably 60 to 90 wt %, based on the total weight of the monomers constituting the crystalline vinyl resin (B), in terms of balance between low-temperature fixability, hot offset resistance, and heat-resistant storage stability.

The total weight percent of the monomers (b) and (d) among the monomers constituting the crystalline vinyl resin (B) is preferably 1 to 47 wt %, more preferably 3 to 45 wt %, still more preferably 5 to 43 wt %, particularly preferably 10 to 40 wt %, based on the total weight of the monomers constituting the crystalline vinyl resin (B), in terms of image strength, heat-resistant storage stability, and electrostatic charge stability.

The acid value of the crystalline vinyl resin (B) is 60 mg KOH/g or less, preferably 40 mg KOH/g or less, more preferably 17 mg KOH/g or less, still more preferably less than 8 mg KOH/g, yet still more preferably less than 3 mg KOH/g, particularly preferably less than 1 mg KOH/g, in terms of electrostatic charge stability.

Preferably, the crystalline vinyl resin (B) has an endothermic peak top temperature of 40° C. to 100° C., in terms of balance between low-temperature fixability, heat-resistant storage stability, and gloss-imparting properties of the toner binder.

Preferably, the half-width of the endothermic peak of the crystalline vinyl resin (B) is 6° C. or less in terms of low-temperature fixability and heat-resistant storage stability. The half-width of the endothermic peak is the temperature width of the peak at half the maximum peak height from the base line of the endothermic peak, based on a DSC curve obtained from the measurement of the endothermic peak top temperature (Tm).

Preferably, the crystalline vinyl resin (B) is free of THF insolubles in terms of low-temperature fixability. When the crystalline vinyl resin (B) contains THF insolubles, the amount of the THF insolubles is preferably 1 wt % or less, more preferably 0.1 to 1.0 wt %.

The number average molecular weight (Mn) of THF solubles in the crystalline vinyl resin (B) is preferably 1000 to 100000, more preferably 1500 to 70000, still more preferably 2000 to 50000, particularly preferably 2500 to 30000, in terms of low-temperature fixability, heat-resistant storage stability, and durability of the toner.

The weight average molecular weight (Mw) of the crystalline vinyl resin (B) is preferably 3000 to 200000, more preferably 3500 to 150000, still more preferably 4000 to 100000, particularly preferably 5000 to 80000, in terms of low-temperature fixability, hot offset resistance, heat-resistant storage stability, and electrostatic charge stability of the toner. In the present invention, the Mw of the crystalline vinyl resin (B) is the Mw of the THF solubles. The Mn and Mw of the crystalline vinyl resin (B) can be measured by the same method used for the amorphous resin (A).

Preferably, the SP(B) indicating the solubility parameter (SP value) of the crystalline vinyl resin (B) is 9.6 to 10.7 $(cal/cm^3)^{0.5}$ in terms of low-temperature fixability and heat-resistant storage stability. The SP(B) can be decreased by, for example, decreasing the acid value, hydroxyl value, and/or cohesive force of the crystalline vinyl resin (B), and/or increasing the weight average molecular weight of the crystalline vinyl resin (B).

The crystalline vinyl resin (B) in the present invention can be produced by polymerizing with a monomer composition containing the monomer (a) and the optional monomer (b) and/or monomer (d) by a known method (e.g., a method described in JP H05-117330 A). For example, the crystalline vinyl resin (B) can be synthesized by the solution polymerization method in which the monomers are reacted in a solvent (e.g., toluene) in the presence of a radical initiator (c).

Any radical reaction initiator (c) may be used. Examples thereof include an inorganic peroxide (c1), an organic peroxide (c2), and an azo compound (c3). These radical reaction initiators may be used in combination.

Any inorganic peroxide (c1) may be used. Examples thereof include hydrogen peroxide, ammonium persulfate, potassium persulfate, and sodium persulfate.

Non-limiting examples of the organic peroxide (c2) include benzoyl peroxide, di-t-butyl peroxide, t-butyl cumyl peroxide, dicumyl peroxide, α,α-bis(t-butylperoxy) diisopropylbenzene, 2,5-dimethyl-2,5-bis(t-butylperoxy) hexane, di-t-hexyl peroxide, 2,5-dimethyl-2,5-di-t-butylperoxyhexine-3, acetyl peroxide, isobutyryl peroxide, octanoyl peroxide, decanoyl peroxide, lauroyl peroxide, 3,3,5-trimethylhexanoyl peroxide, m-tolyl peroxide, t-butyl peroxyisobutyrate, t-butyl peroxyneodecanoate, cumyl peroxyneodecanoate, t-butyl peroxy-2-ethylhexanoate, t-butyl peroxy-3,5,5-trimethylhexanoate, t-butyl peroxylaurate, t-butyl peroxybenzoate, t-butyl peroxy isopropyl monocarbonate, and t-butyl peroxyacetate.

Non-limiting examples of the azo compound (c3) include 2,2'-azobis(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and azobisisobutyronitrile.

Preferred among these are the organic peroxides (c2) because they have high initiator efficiency and do not produce toxic by-products such as cyanide.

More preferred are reaction initiators having a high hydrogen abstraction ability because they efficiently promote crosslinking reactions and can be used in smaller amounts. Still more preferred are radical reaction initiators having a high hydrogen abstraction ability, such as benzoyl peroxide, di-t-butyl peroxide, t-butylcumyl peroxide, t-butylperoxy-2-ethylhexanoate, dicumyl peroxide, α,α-bis (t-butylperoxy)diisopropylbenzene, 2,5-dimethyl-2,5-bis(t-butylperoxy)hexane, and di-t-hexyl peroxide.

The toner binder of the present invention contains the amorphous resin (A) and the crystalline vinyl resin (B), and the weight ratio [(A)/(B)] of the amorphous resin (A) to the crystalline vinyl resin (B) is 81/19 to 97/3.

The low-temperature fixability is poor when the weight percent of the crystalline vinyl resin (B) based on the total weight of the amorphous resin (A) and the crystalline vinyl resin (B) is less than 3 wt %. The hot offset resistance, electrostatic charge stability, image strength, and durability are poor when the weight percent of the crystalline vinyl resin (B) is more than 19 wt %.

The weight ratio [(A)/(B)] of the amorphous resin (A) to the crystalline vinyl resin (B) is preferably 82/18 to 96/4, more preferably 83/17 to 96/4, still more preferably 84/16 to 95/5, particularly preferably 85/15 to 95/5, in terms of low-temperature fixability, hot offset resistance, electrostatic charge stability, image strength, and durability of the resulting toner.

The toner binder of the present invention has an endothermic peak top temperature (Tm) derived from the crystalline vinyl resin (B) of 40° C. to 100° C. The toner binder having the endothermic peak top temperature (Tm) in the above range has good balance between low-temperature fixability, heat-resistant storage stability, and gloss-imparting properties. This is because the crystalline vinyl resin (B) is sharply melted and decreases its viscosity at a temperature indicating the endothermic peak top temperature (Tm), and the storage stability required for the resulting toner is satisfied.

The endothermic peak top temperature (Tm) is measured in a differential scanning calorimeter, and is the temperature of the endothermic peak derived from the crystalline vinyl resin (B) during second heating on a DSC curve obtained by heating the toner binder from 20° C. to 150° C. at 10° C./min for first heating, cooling from 150° C. to 0° C. at 10° C./min, and then heating from 0° C. to 150° C. at 10° C./min for the second heating.

The endothermic peak top temperature (Tm) is preferably 43° C. to 95° C., more preferably 45° C. to 90° C., still more preferably 48° C. to 88° C., particularly preferably 50° C. to 68° C., in terms of low-temperature fixability and heat-resistant storage stability of the resulting toner.

The endothermic peak top temperature (Tm) of the toner binder can be adjusted to the preferred range by adjusting the carbon number and/or weight ratio of the monomer (a) constituting the crystalline vinyl resin (B). For example, increasing the carbon number and/or weight ratio of the monomer (a) and/or increasing the weight average molecular weight of the crystalline vinyl resin (B) increases the endothermic peak top temperature (Tm). When the amount of the crystalline vinyl resin (B) is small, the Tm can be maintained without a decrease by increasing the absolute value of difference |SP(A)−SP(B)| (also referred to as "|ΔSP value|") between the SP value (SP(B)) of the crystalline vinyl resin (B) and the SP value (SP(A)) of the amorphous resin (A).

Preferably, the toner binder of the present invention has at least one inflexion point indicating a glass-transition temperature ($Tg_T$) in the temperature range of −30° C. to 80° C. in a chart obtained by differential scanning calorimetry (DSC) using the toner binder of the present invention. More preferably, the inflexion point indicating the glass-transition temperature ($Tg_T$) is in the temperature range of 25° C. to 65° C. The heat-resistant storage stability is good when the inflexion point indicating the glass-transition temperature ($Tg_T$) is in the temperature range of −30° C. or higher. The low-temperature fixability is good when the inflexion point is in the temperature range of 80° C. or lower.

The toner binder of the present invention has a half-width of the endothermic peak derived from the crystalline vinyl resin (B) of 6° C. or less. A half-width of 6° C. or less results in excellent balance between low-temperature fixability and heat-resistant storage stability. More preferably, the half-width is 3° C. to 6° C.

The half-width can be adjusted by, for example, selecting vinyl acetate (i.e., the monomer (b) difficult to polymerize with the monomer (a)) as a constituent monomer of the crystalline vinyl resin (B), increasing the crystallinity of the crystalline vinyl resin (B), increasing the carbon number and/or weight ratio of the monomer (a) constituting the crystalline vinyl resin (B), and/or increasing the weight average molecular weight of the crystalline vinyl resin (B).

The half-width of the endothermic peak derived from the crystalline vinyl resin (B) of the toner binder is the temperature width of the peak at half the maximum peak height from the base line of the endothermic peak, based on a DSC curve obtained from the measurement of the endothermic peak top temperature (Tm).

The toner binder of the present invention satisfies the following relation (1):

$$3° C. \leq Tfb(A) - Tfb(C) \leq 30° C. \qquad \text{relation (1):}$$

Here, the Tfb(C) is the flow starting temperature (° C.) of the toner binder measured by a Koka-type flow tester. The Tfb(A) is the flow starting temperature (° C.) of the amorphous resin (A) measured by a Koka-type flow tester.

The Tfb(C) is the flow starting temperature of the toner binder, and the flow starting temperature is considered to correspond to a thermal fixing step of the toner. In other words, the relation (1) is an index that indicates whether the crystalline vinyl resin (B) is partially compatibilized with the amorphous resin (A) and the amorphous resin (A) is plasticized. When the difference between the Tfb(A) indicating the flow starting temperature of the amorphous resin (A) and the Tfb(C) satisfies the relation (1), it is possible to design a toner binder having an excellent balance between low-temperature fixability, gloss-imparting properties, and hot offset resistance. The relation (1) is adjusted by adjusting the ASP value between the amorphous resin (A) and the crystalline vinyl resin (B), adjusting the acid value of the amorphous resin (A) and/or the crystalline vinyl resin (B), and/or adjusting the molecular weight of the amorphous resin (A) and/or the crystalline vinyl resin (B). For example, the value of the relation (1) is decreased by decreasing the ASP value between the amorphous resin (A) and the crystalline vinyl resin (B), increasing the weight ratio of the monomer (a) constituting the crystalline vinyl resin (B), increasing the acid value of the amorphous resin (A) and/or the crystalline vinyl resin (B), and/or decreasing the weight average molecular weight of the amorphous resin (A) and/or the crystalline vinyl resin (B).

The method of measuring the Tfb(C) is described.

The toner binder (1 g) used as a sample is heated from 40° C. at 6° C./min with a load of 196.133×10⁴ Pa, using a Koka-type flow tester with a die having a diameter of 1 mm and a length of 1 mm to measure the outflow of the melted toner binder. During the measurement, the temperature at which the toner binder starts to flow, i.e., the temperature at which piston stroke starts to increase again after it increased slightly due to thermal expansion of the sample, is determined as Tfb(C).

Preferably, the flow softening point (T1/2) of the toner binder of the present invention is 70° C. to 150° C. in terms of low-temperature fixability and heat-resistant storage stability.

The flow softening point (T1/2) can be measured under the same conditions used for the amorphous resin (A).

Preferably, the toner binder of the present invention has an amount of endothermic heat Q1 of 15 J/g or less in terms of low-temperature fixability, heat-resistant storage stability, image strength, and durability. The amount of endothermic heat Q1 is adjusted by adjusting the ΔSP value between the amorphous resin (A) and the crystalline vinyl resin (B), adjusting the acid value of the amorphous resin (A) and/or the crystalline vinyl resin (B), and/or adjusting the molecular weight of the amorphous resin (A) and/or the crystalline vinyl resin (B). For example, the amount of endothermic heat Q1 is decreased by decreasing the ΔSP value between the amorphous resin (A) and the crystalline vinyl resin (B), decreasing the weight ratio of the monomer (a) constituting the crystalline vinyl resin (B), increasing the acid value of the amorphous resin (A) and/or the crystalline vinyl resin (B), and/or decreasing the weight average molecular weight of the amorphous resin (A) and/or the crystalline vinyl resin (B).

The amount of endothermic heat Q1 is more preferably 1 to 14 J/g, still more preferably 2 to 13 J/g, particularly preferably 3 to 12 J/g, most preferably 4 to 11 J/g, in terms of low-temperature fixability, heat-resistant storage stability, image strength, and durability.

The amount of endothermic heat Q1 is the amount of endothermic heat based on the endothermic peak derived from the crystalline vinyl resin (B) during the second heating in the differential scanning calorimeter (DSC).

The toner binder of the present invention may contain compounds used during polymerization of the crystalline vinyl resin (B) and residues of such compounds, and may also contain one or more resins other than the amorphous resin (A) and the crystalline vinyl resin (B) and one or more known additives (e.g., release agent), as long as the effects of the present invention are not impaired.

Preferably, the toner binder of the present invention satisfies the following relation (2) in terms of low-temperature fixability, gloss-imparting properties, heat-resistant storage stability, electrostatic charge stability, and durability. A |SP(A)−SP(B)| of less than 0.3 (cal/cm$^3$)$^{0.5}$ may result in poor heat-resistant storage stability, electrostatic charge stability, and durability. A |SP(A)−SP(B)| of more than 2.5 (cal/cm$^3$)$^{0.5}$ may result in poor low-temperature fixability and gloss-imparting properties.

$$0.3 \text{ (cal/cm}^3)^{0.5} \leq |SP(A)-SP(B)| \leq 2.5 \text{ (cal/cm}^3)^{0.5} \quad \text{Relation (2):}$$

In the relation (2), the SP(A) is the solubility parameter (SP value) of the amorphous resin (A), and the SP(B) is the SP value of the crystalline vinyl resin (B).

The |SP(A)−SP(B)| is more preferably 0.4 to 2.0 (cal/cm$^3$)$^{0.5}$, still more preferably 0.5 to 1.8 (cal/cm$^3$)$^{0.5}$, particularly preferably 0.6 to 1.7 (cal/cm$^3$)$^{0.5}$, most preferably 0.7 to 1.6 (cal/cm$^3$)$^{0.5}$, in terms of low-temperature fixability, gloss-imparting properties, heat-resistant storage stability, electrostatic charge stability, and durability.

In the toner binder of the present invention, preferably, the amorphous resin (A) is the amorphous polyester resin (A1) having an SP value of 10.7 to 11.9 (cal/cm$^3$)$^{0.5}$, in terms of low-temperature fixability, gloss-imparting properties, heat-resistant storage stability, electrostatic charge stability, and durability.

The toner binder of the present invention may contain TH insolubles.

The amount (wt %) of the THF insolubles in the toner binder of the present invention is preferably 80 wt % or less, more preferably 60 wt % or less, still more preferably 50 wt % or less, particularly preferably 0.1 to 45 wt %, most preferably 1 to 40 wt %, in terms of low-temperature fixability, gloss-imparting properties, and hot offset resistance.

The amount (wt %) of the THF insolubles in the toner binder of the present invention is determined by the following method.

THF (50 mL) is added to 0.5 g of a sample, and the mixture is stirred and refluxed for three hours. After cooling, the insolubles are separated by filtration with a glass filter, and the resin remaining on the glass filter is dried at 80° C. under reduced pressure for three hours. The amount of the dried resin remaining on the glass filter is assumed to be the amount of THF insolubles, and the amount of the THF insolubles is subtracted from the amount of the sample to determine the amount of THF solubles. Then, the percent by weight of the THF insolubles and the percent by weight of the THF solubles are calculated.

The amount of the THF insolubles in the amorphous resin (A) and the crystalline vinyl resin (B) can also be determined by the above method.

The Mn of the toner binder of the present invention is preferably 500 to 24000, more preferably 700 to 17000, still more preferably 900 to 12000, in terms of balance between heat-resistant storage stability and low-temperature fixability of the toner.

The Mw of the toner binder of the present invention is preferably 5000 to 120000, more preferably 7000 to 100000, still more preferably 9000 to 90000, particularly preferably 10000 to 80000, in terms of balance between hot offset resistance and low-temperature fixability of the toner.

The Mn and Mw of the toner binder can be measured by the same method used for the amorphous resin (A). The Mn and Mw of the toner binder are the Mn and Mw of the THF solubles.

The molecular weight distribution Mw/Mn of the THF solubles in the toner binder of the present invention is preferably 2 to 30, more preferably 2.5 to 28, still more preferably 3 to 26, in terms of balance between hot offset resistance, heat-resistant storage stability, and low-temperature fixability of the toner.

A method of producing the toner binder is described.

The toner binder is not particularly limited as long as it contains the amorphous resin (A) and the crystalline vinyl resin (B). For example, when mixing the amorphous resin (A), the crystalline vinyl resin (B), and additives, a known mixing method may be used. Examples of the mixing method include powder mixing, melt mixing, and solvent mixing. The amorphous resin (A), the crystalline vinyl resin (B), and optional additives may be added simultaneously during production of the toner. Preferred among these methods is melt mixing that enables uniform mixing, without the need for solvent removal.

Examples of mixing devices for powder mixing include a Henschel mixer, a Nauta mixer, and a Banbury mixer. A Henschel mixer is preferred.

Examples of mixing devices for melt mixing include batch mixing devices such as a reaction tank, and continuous mixing devices. Continuous mixing devices are preferred in order to uniformly mix at an appropriate temperature in a short time. Examples of the continuous mixing devices include twin-screw kneaders, static mixers, extruders, continuous kneaders, and triple roll mills.

Examples of methods for solvent mixing include a method in which the amorphous resin (A) and the crystalline vinyl resin (B) are dissolved and homogenized in solvents (e.g., ethyl acetate, THF, and acetone), followed by solvent removal and grinding; and a method in which the amorphous resin (A) and the crystalline vinyl resin (B) are dissolved in solvents, and the solution of the amorphous resin (A) and the crystalline vinyl resin (B) in the solvents is dispersed in water to be uniformly dispersed, followed by solvent removal.

The toner containing the toner binder of the present invention is one of preferred embodiments of the present invention. The toner containing the toner binder of the present invention may contain a colorant, a release agent, a charge control agent, a fluidizer, and other additives, if necessary.

Any dyes and pigments used as coloring agents for toners may be used as the colorant. Specific examples thereof include carbon black, iron black, Sudan black SM, Fast Yellow G, Benzidine Yellow, Pigment Yellow, Indo Fast Orange, Irgazin Red, Paranitroaniline Red, Toluidine Red, Carmine FB, Pigment Orange R, Lake Red 2G, Rhodamine FB, Rhodamine B Lake, Methyl violet B Lake, Phthalocyanine Blue, Pigment Blue, Brilliant Green, Phthalocyanine Green, Oil Yellow GG, Kayaset YG, Orasol Brown B, and Oil Pink OP. These colorants may be used alone or in combination of two or more thereof. If necessary, magnetic powder (powder of a ferromagnetic metal such as iron, cobalt, or nickel, or a compound such as magnetite, hematite, or ferrite) may be added to also serve as a colorant.

The amount of the colorant is preferably 1 to 40 parts by weight, more preferably 3 to 10 parts by weight, relative to 100 parts by weight of the toner binder of the present invention. The amount of the magnetic powder, if used, is preferably 20 to 150 parts by weight, more preferably 40 to 120 parts by weight, relative to 100 parts by weight of the toner binder of the present invention.

Preferably, the release agent is one having a flow softening point (T1/2) of 50° C. to 170° C. as measured by a Koka-type flow tester. Examples thereof include aliphatic hydrocarbon waxes and oxides thereof, such as polyolefin wax, microcrystalline wax, paraffin wax, and Fischer-Tropsch wax; ester waxes such as carnauba wax, montan wax, deoxidized wax thereof, and fatty acid ester wax; fatty acid amides; fatty acids; higher alcohols; fatty acid metal salts; and mixtures thereof.

The flow softening point (T1/2) can be measured under the same conditions used for the amorphous resin (A).

Examples of the polyolefin wax includes (co)polymers of olefins (e.g., ethylene, propylene, 1-butene, isobutylene, 1-hexene, 1-dodecene, 1-octadecene, and mixtures thereof) (including those obtained by (co)polymerization and thermo-degradation type polyolefins) (e.g., low molecular weight polypropylene, low molecular weight polyethylene, and low molecular weight polypropylene-polyethylene copolymers); oxides with oxygen and/or ozone of (co)polymers of olefins; maleic acid-modified products of (co)polymers of olefins (e.g., those modified by maleic acid and derivatives thereof (e.g., maleic anhydride, monomethyl maleate, monobutyl maleate, and dimethyl maleate)); copolymers of olefins and unsaturated carboxylic acids (such as (meth)acrylic acid, itaconic acid, and maleic anhydride) and/or unsaturated carboxylic acid alkyl esters (such as (meth)acrylic acid alkyl (C1-C18 alkyl group) esters, and maleic acid alkyl (C1-C18 alkyl group) esters); and Sasol wax.

Examples of the paraffin wax include Paraffin WAX-155, Paraffin WAX-150, Paraffin WAX-145, Paraffin WAX-140, Paraffin WAX-135, HNP-3, HNP-5, HNP-9, HNP-10, HNP-11, HNP-12, and HNP-51 available from Nippon Seiro Co., Ltd.

The higher alcohols include C30-C50 aliphatic alcohols, such as triacontanol. The fatty acids include C30-C50 fatty acids, such as triacontane carboxylic acid.

The charge control agent may be a positive charge control agent or a negative charge control agent, and examples thereof include nigrosine dyes, triphenylmethane dyes containing a tertiary amine as a side chain, quaternary ammonium salts, polyamine resins, imidazole derivatives, quaternary ammonium salt group-containing polymers, metal-containing azo dyes, copper phthalocyanine dyes, salicylic acid metal salts, boron complexes of benzilic acid, sulfonic acid group-containing polymers, fluorine-containing polymers, and halogen-substituted aromatic ring-containing polymers.

Examples of the fluidizer include silica, titania, alumina, calcium carbonate, fatty acid metal salts, silicone resin particles, and fluororesin particles. Two or more thereof may be used in combination. Preferred among these is silica in terms of electrostatic charge stability of the toner. Preferably, the silica is hydrophobic silica in terms of transferability of the toner.

The ratio of components of the toner containing the toner binder based on the weight of the toner is as follows: the toner binder of the present invention accounts for preferably 30 to 97 wt %, more preferably 40 to 95 wt %, still more preferably 45 to 92 wt %; the colorant accounts for preferably 0.05 to 60 wt %, more preferably 0.1 to 55 wt %, still more preferably 0.5 to 50 wt %. Further, based on the weight of the toner, the release agent as one of the additives accounts for preferably 0 to 30 wt %, more preferably 0.5 to 20 wt %, still more preferably 1 to 10 wt %; the charge control agent as one of the additives accounts for preferably 0 to 20 wt %, more preferably 0.1 to 10 wt %, still more preferably 0.5 to 7.5 wt %; and the fluidizer as one of the additives accounts for preferably 0 to 10 wt %, more preferably 0 to 5 wt %, still more preferably 0.1 to 4 wt %. The total amount of the additives (including the colorant) is preferably 3 to 70 wt %, more preferably 4 to 58 wt %, still more preferably 5 to 50 wt %.

A ratio of components of the toner in the above ranges can provide a toner having good hot offset resistance and good electrostatic charge stability.

The method of producing the toner containing the toner binder of the present invention is not limited, and any of the following known methods may be used to obtain a toner: kneading grinding method, phase-change emulsion method, emulsion polymerization method, suspension polymerization method described in JP S36-10231 B, JP S59-53856 A, and JP S59-61842 A, dissolution suspension method, and emulsion aggregation method described in JP S62-106473 A and JP S63-186253 A.

For example, in the case where the kneading grinding method is used to obtain a toner, the toner can be produced as follows: components (other than a fluidizer) that constitute the toner are dry-blended by a device such as a Henschel mixer, a Nauta mixer, or a Banbury mixer; melt-kneaded by a continuous mixer such as a twin-screw kneader, an extruder, a continuous kneader, or a three-roll mill; coarsely ground by a mill or the like; and ultimately formed into fine particles by a jet mill grinder or the like. Further, the particle size distribution is adjusted by a classifier such as an elbow jet to obtain toner particles preferably having a volume average particle size (D50) of 5 to 20 μm, and the fluidizer is added to the toner particles. Thus, the toner can be produced.

The volume average particle size (D50) is measured using a Coulter counter (e.g., Multisizer III (product name) available from Beckman Coulter, Inc.).

Specifically, a surfactant (alkylbenzenesulfonate) (0.1 to 5 mL) as a dispersant is added to an electrolyte solution "ISOTON-II" (Beckman Coulter, Inc.) (100 to 150 mL). Further, a measurement sample (2 to 20 mg) is added to the electrolyte solution to suspend the sample therein. The electrolyte solution is dispersed using an ultrasonic disperser for about 1 to 3 minutes. Using the measuring device, the volume and number of toner particles are measured with an aperture of 50 μm, and the volume distribution and number distribution are calculated. The volume average particle size (D50) (μm), number average particle size (μm), and particle size distribution (volume average particle size/number average particle size) of the toner particles are determined from the volume distribution and number distribution.

In the case where the phase-change emulsion method is used to obtain a toner, components (other than a fluidizer) that constitute the toner are dissolved or dispersed in an organic solvent, and the resulting solution or dispersion is emulsified by, for example, adding water thereto, followed by separation and classification. Thus, the toner can be produced. Preferably, the toner has a volume average particle size of 3 to 15 μm.

The toner containing the toner binder of the present invention is mixed, if necessary, with carrier particles such as iron powder, glass beads, nickel powder, ferrite, magnetite, and ferrite whose surface is coated with resin (e.g., acrylic resin or silicone resin) for use as a developer for electric latent images. Preferably, the weight ratio of the toner to the carrier particles (if used) is 1/99 to 99/1. The toner can also form electric latent images by friction with a member such as an electrostatically charged blade instead of mixing with the carrier particles.

The toner containing the toner binder of the present invention does not necessarily contain carrier particles.

The toner containing the toner binder of the present invention is fixed to a support (e.g., paper or polyester film) by a device such as a copy machine or a printer, whereby a recording material is obtained. The toner can be fixed on a support by a known method such as a heat roll fixing method or a flash fixing method.

The toner produced using the toner binder of the present invention is used to develop electrostatic images or magnetic latent images by methods such as an electrographic method, an electrostatic recording method, or an electrostatic printing method. More specifically, the toner is used to develop electrostatic images or magnetic latent images, particularly suitable for full color images.

EXAMPLES

The present invention is further described below with reference to examples and comparative examples, but the present invention is not limited thereto. Hereinafter, "part(s)" means part(s) by weight unless otherwise specified.

The glass-transition temperature (Tg) was measured using DSC Q20 available from TA Instruments by the method (DSC method) prescribed in ASTM D3418-82. Glass-transition temperature measurement conditions are described below.

<Measurement Conditions>
(1) Temperature is increased from 30° C. to 150° C. at 20° C./min.
(2) Temperature is maintained at 150° C. for 10 minutes.
(3) Temperature is cooled to −35° at 20° C./min.
(4) Temperature is maintained at −35° C. for 10 minutes.
(5) Temperature is increased to 150° C. at 20° C./min.
(6) A curve of differential scanning calorimetry measured during (5) was analyzed.

The flow starting temperature of the toner binder (Tfb(C)) and the flow starting temperature of the amorphous resin (A) (Tfb(A)) were measured by the following method.

The toner binder (1 g) used as a sample was heated from 40° C. at 6° C./min with a load of $196.133 \times 10^4$ Pa, using a Koka-type flow tester (CFT-500D, Shimadzu Corporation) with a die having a diameter of 1 mm and a length of 1 mm to measure the outflow of the melted toner binder. The temperature at which the toner binder started to flow, i.e., the temperature at which piston stroke started to increase again after it increased slightly due to thermal expansion of the sample, was determined as Tfb(C).

In the above method, the amorphous resin (A) (1 g) used as a sample was measured under the same conditions. During the measurement, the temperature at which the amorphous resin (A) starts to flow was determined as Tfb(A).

The acid value and the hydroxyl value were measured by the methods prescribed in JIS K 0070. The solvent for measuring the acid value was a mixed solvent of acetone, methanol, and toluene (acetone:methanol:toluene=12.5: 12.5:75), and the solvent for measuring the hydroxyl value was THF.

The weight average molecular weight was measured by GPC under the following conditions.
  Device: HLC-8120 available from Tosoh Corporation
  Column: TSK GEL GMH6, two columns (Tosoh Corporation)
  Measurement temperature: 40° C.
  Sample solution: 0.25 wt % solution in THF
  Amount of solution to be injected: 100 μL
  Detection device: refractive index detector
  Reference substance: standard polystyrene available from Tosoh Corporation (TSK standard polystyrene), 12 samples (molecular weight: 500, 1050, 2800, 5970, 9100, 18100, 37900, 96400, 190000, 355000, 1090000, and 2890000)

For the measurement of the weight average molecular weight, the sample was dissolved in THF to a concentration of 0.25 wt %, and insolubles were filtered out by a glass filter to obtain a sample solution.

The SP value (at 25° C.) was calculated by the method disclosed by Robert F. Fedors et al., Polymer Engineering and Science, February, 1974, Vol. 14, pp. 151-154.

The flow softening point was measured using a Koka-type flow tester (CFT-500D, Shimadzu Corporation). A measurement sample (1 g) was pushed through a nozzle having a diameter of 1 mm and a length of 1 mm by application of a load of 1.96 MPa with a plunger while the measurement sample was heated at a heating rate of 6° C./min. A graph of "plunger descending amount (flow value)" against "temperature" was plotted, and the temperature corresponding to 1/2 of the maximum plunger descending amount was determined as the flow softening point.

<Production Example 1> [Synthesis of Amorphous Resin (A-1)]

A reaction tank equipped with a condenser, a heating and cooling device, a thermometer, a stirrer, and a nitrogen inlet was charged with propylene glycol (731 parts by weight), an adduct of 2 mol ethylene oxide with bisphenol A (2 parts by weight), an adduct of 2 mol propylene oxide with bisphenol A (3 parts by weight), terephthalic acid (673 parts by weight), adipic acid (38 parts by weight), benzoic acid (34 parts by weight), trimellitic anhydride (53 parts by weight), and tetrabutoxy titanate as a condensation catalyst (3 parts by weight). The mixture was reacted at 220° C. for 20 hours under increased pressure while generated water was removed. Subsequently, normal pressure was resumed by gradually decreasing the pressure, and the reaction was further continued at a reduced pressure of 0.5 to 2.5 kPa. When the flow softening point was 130° C., a resin (a-1) was taken out using a steel belt cooler. The amount of propylene glycol removed was 352 parts by weight.

Another reaction tank equipped with a condenser, a heating and cooling device, a thermometer, a stirrer, and a nitrogen inlet was charged with propylene glycol (583 parts by weight), an adduct of 2 mol ethylene oxide with bisphenol A (2 parts by weight), an adduct of 2 mol propylene oxide with bisphenol A (48 parts by weight), terephthalic acid (625 parts by weight), adipic acid (10 parts by weight), benzoic acid (49 parts by weight), trimellitic anhydride (58 parts by weight), and tetrabutoxy titanate as a condensation catalyst (3 parts by weight). The mixture was reacted at 220° C. for 10 hours under increased pressure while generated water was removed. Subsequently, normal pressure was resumed by gradually decreasing the pressure, and the reaction was further continued at a reduced pressure of 0.5 to 2.5 kPa. When the flow softening point was 105° C., normal pressure was resumed, and the reaction product was cooled to 180° C. Trimellitic anhydride (17 parts) was added for further reaction for one hour. The reaction product was cooled to 150° C., and a resin (a-2) was taken out using a steel belt cooler. The amount of propylene glycol removed was 232 parts by weight.

The resin (a-1) and the resin (a-2) obtained above were homogenized by a Henschel mixer (FM10B, Nippon Coke & Engineering Co. Ltd.) to obtain a weight ratio (a-1)/(a-2) of 50/50. Thus, an amorphous polyester resin, namely an amorphous resin (A-1), was obtained.

<Production Example 2> [Synthesis of Amorphous Resin (A-2)]

A reaction tank equipped with a condenser, a heating and cooling device, a thermometer, a stirrer, and a nitrogen inlet was charged with an adduct of 2 mol ethylene oxide with bisphenol A (318 parts by weight), an adduct of 2 mol propylene oxide with bisphenol A (421 parts by weight), terephthalic acid (274 parts by weight), and tetrabutoxy titanate as a condensation catalyst (3 parts by weight). The mixture was reacted at 220° C. for 10 hours under increased pressure while generated water was removed. Subsequently, normal pressure was resumed by gradually decreasing the pressure, and the reaction was further continued at a reduced pressure of 0.5 to 2.5 kPa. When the flow softening point was 100° C., normal pressure was resumed, and the reaction product was cooled to 180° C. Trimellitic anhydride (41 parts) was added for further reaction for one hour. The reaction product was cooled to 150° C., and a resin (a-3) was obtained using a steel belt cooler.

Another reaction tank equipped with a condenser, a heating and cooling device, a thermometer, a stirrer, and a nitrogen inlet was charged with an adduct of 2 mol ethylene oxide with bisphenol A (169 parts by weight), an adduct of 2 mol propylene oxide with bisphenol A (127 parts by weight), an adduct of 3 mol propylene oxide with bisphenol A (467 parts by weight), terephthalic acid (184 parts by weight), trimellitic anhydride (53 parts by weight), and tetrabutoxy titanate as a condensation catalyst (3 parts by weight). The mixture was reacted at 220° C. for 10 hours under increased pressure while generated water was removed. Subsequently, normal pressure was resumed by gradually decreasing the pressure, and the reaction was further continued at a reduced pressure of 0.5 to 2.5 kPa. When the flow softening point was 110° C., normal pressure was resumed, and the reaction product was cooled to 180° C. Trimellitic anhydride (51 parts by weight) was added, and the temperature was increased to 210° C. for further reaction under a reduced pressure of 0.5 to 2.5 kPa. When the flow softening point was 145° C., a resin (a-4) was obtained using a steel belt cooler.

The resin (a-3) and the resin (a-4) obtained above were homogenized by a Henschel mixer to obtain a weight ratio (a-3)/(a-4) of 50/50. Thus, an amorphous polyester, namely an amorphous resin (A-2), was obtained.

<Production Example 3> [Synthesis of Amorphous Resin (A-3)]

A reaction tank equipped with a condenser, a heating and cooling device, a thermometer, a stirrer, and a nitrogen inlet was charged with an adduct of 2 mol propylene oxide with bisphenol A (616 parts by weight), an adduct of 3 mol propylene oxide with bisphenol A (161 parts by weight), terephthalic acid (268 parts by weight), fumaric acid (1 part), and tetrabutoxy titanate as a condensation catalyst (3 parts by weight). The mixture was reacted at 220° C. for 10 hours under increased pressure while generated water was removed. Subsequently, normal pressure was resumed by gradually decreasing the pressure, and the reaction was further continued at a reduced pressure of 0.5 to 2.5 kPa. When the flow softening point was 100° C., normal pressure was resumed, and the reaction product was cooled to 180° C. Trimellitic anhydride (9 parts by weight) was added for further reaction for one hour. The reaction product was cooled to 150° C., and a resin (a-5) was obtained using a steel belt cooler.

Another reaction tank equipped with a condenser, a heating and cooling device, a thermometer, a stirrer, and a nitrogen inlet was charged with an adduct of 2 mol propylene oxide with bisphenol A (193 parts by weight), an adduct of 3 mol propylene oxide with bisphenol A (539 parts by weight), terephthalic acid (173 parts by weight), adipic acid (67 parts), trimellitic anhydride (6 parts by weight), and tetrabutoxy titanate as a condensation catalyst (3 parts by weight). The mixture was reacted at 220° C. for 10 hours under increased pressure while generated water was removed. Subsequently, normal pressure was resumed by gradually decreasing the pressure, and the reaction was further continued at a reduced pressure of 0.5 to 2.5 kPa. When the acid value was 1 or lower, normal pressure was resumed, and the reaction product was cooled to 180° C. Trimellitic anhydride (80 parts by weight) was added to continue the reaction at 180° C. for one hour. Then, the temperature was increased to 200° C. for further reaction under a reduced pressure of 0.5 to 2.5 kPa. Normal pressure was resumed when the flow softening point was 137° C. Further, when the flow softening point was 147° C., a resin (a-6) was obtained using a steel belt cooler.

The resin (a-5) and the resin (a-6) obtained above were homogenized by a Henschel mixer to obtain a weight ratio of (a-5)/(a-6) of 70/30. Thus, an amorphous polyester resin, namely an amorphous resin (A-3), was obtained.

Table 1 shows physical property values of the amorphous resin (A-1) to (A-3).

TABLE 1

| | | Amorphous resin (A) | | | | | |
|---|---|---|---|---|---|---|---|
| | | Production Example 1 (A-1) | | Production Example 2 (A-2) | | Production Example 3 (A-3) | |
| | | (a-1) | (a-2) | (a-3) | (a-4) | (a-5) | (a-6) |
| Alcohol | Propylene glycol | 379 | 351 | — | — | — | — |
| | Adduct of 2 mol ethylene oxide with bisphenol A | 2 | 2 | 318 | 169 | — | — |
| | Adduct of 2 mol propylene oxide with bisphenol A | 3 | 48 | 421 | 127 | 616 | 193 |
| | Adduct of 3 mol propylene oxide with bisphenol A | — | — | — | 467 | 161 | 539 |
| Carboxylic acid | Terephthalic acid | 673 | 625 | 274 | 184 | 268 | 173 |
| | Adipic acid | 38 | 10 | — | — | — | 67 |
| | Fumaric acid | — | — | — | — | 1 | — |
| | Benzoic acid | 34 | 49 | — | — | — | — |
| | Trimellitic anhydride | 53 | 75 | 41 | 104 | 9 | 86 |
| Analysis value | Glass-transition temperature (Tg) (° C.) | 64 | | 62 | | 58 | |
| | Flow starting temperature Tfb(A) (° C.) | 99 | | 97 | | 87 | |
| | Acid value (mg KOH/g) | 6 | | 22 | | 11 | |
| | Hydroxyl value (mg KOH/g) | 23 | | 40 | | 40 | |
| | Weight average molecular weight | 50,000 | | 140,000 | | 150,000 | |
| SP(A) $(cal/cm^3)^{0.5}$ | | 11.9 | | 11.2 | | 11.1 | |

<Production Example 4> [Synthesis of Amorphous Resin (A-4)]

A reaction tank was charged with xylene (267 parts by weight), and heated to 170° C. Another vessel was charged with styrene (Idemitsu Kosan Co., Ltd., hereinafter the same) (488 parts by weight), butyl acrylate (Nippon Shokubai Co., Ltd., hereinafter the same) (89 parts by weight), acrylonitrile (Nacalai Tesque, Inc., hereinafter the same) (23 parts by weight), xylene (123 parts by weight), and Perbutyl D (di-t-butyl peroxide, NOF Corporation, hereinafter the same) (11 parts by weight). The mixture was dropped to the reaction tank over three hours. The drop line was washed with xylene (20 parts by weight), and the reaction tank was maintained at the same temperature for 30 minutes to complete polymerization. When the polymerization rate was found to be 99% or higher, the pressure was decreased to remove the solvent (xylene) from the reaction tank. Thus, an amorphous vinyl resin, namely amorphous resin (A-4), was obtained.

Table 2 shows physical property values of the amorphous resin (A-4).

TABLE 2

| | | Amorphous resin (A) Production Example 4 (A-4) (a-4) |
|---|---|---|
| Monomer | Acrylonitrile | 23 |
| | Styrene | 488 |
| | Butyl acrylate | 89 |
| Initiator | Di-t-butyl peroxide | 11 |
| Analysis value | Glass-transition temperature (Tg) (° C.) | 60 |
| | Flow starting temperature Tfb(A) (° C.) | 90 |
| | Acid value (mg KOH/g) | 1 |
| | Hydroxyl value (mg KOH/g) | 1 |
| | Weight average molecular weight | 13,000 |
| SP(A) $(cal/cm^3)^{0.5}$ | | 10.6 |

<Production Example 5> [Production of Crystalline Vinyl Resin (B-1)]

An autoclave was charged with toluene (46 parts). After nitrogen purging, the autoclave was heated to 105° C. in a sealed state under stirring. A mixed solution of behenyl acrylate (NOF Corporation, hereinafter the same) (64.0 parts), styrene (16.7 parts), acrylonitrile (16.7 parts), Karenz MOI (2-isocyanatoethyl methacrylate, Showa Denko K.K., hereinafter the same) (1.9 parts), perbutyl O (t-butylperoxy-2-ethylhexanoate, NOF Corporation, hereinafter the same) (0.4 parts), and toluene (23 parts) was dropped to the autoclave over two hours for polymerization while the internal temperature of the autoclave was controlled to stay at 105° C. The autoclave was further maintained at the same temperature for four hours to complete polymerization. Then, methanol (0.6 parts) and Neostann U-600 (Nitto Kasei Kogyo K.K., hereinafter the same) (0.5 parts) were added for reaction at 90° C. for six hours. Since the reaction rate of the monomer (a) was lower than 98% when checked, Perbutyl D (0.1 parts) was further added to the autoclave to continue the reaction until the reaction rate reached 98% or higher. Subsequently, the solvent was removed at 100° C. Thus, a crystalline vinyl resin (B-1) was obtained.

<Production Example 6> [Production of Crystalline Vinyl Resin (B-2)]

An autoclave was charged with xylene (18.3 parts). After nitrogen purging, the autoclave was heated to 170° C. in a sealed state under stirring. A mixed solution of behenyl acrylate (60.0 parts), styrene (10.0 parts), acrylonitrile (30.0 parts), Perbutyl D (di-t-butyl peroxide, NOF Corporation, hereinafter the same) (4 parts), and xylene (13.3 parts) was dropped to the autoclave over three hours for polymerization while the internal temperature of the autoclave was controlled to stay at 170° C. After dropping, the drop line was washed with xylene (1.7 parts). The autoclave was further maintained at the same temperature for 0.5 hours. Since the reaction rate of the monomer (a) was lower than 98% when checked, Perbutyl D (0.5 parts) was further added to the autoclave to continue the reaction until the reaction rate reached 98% or higher. The solvent was removed at 170° C. for three hours under a reduced pressure of 0.5 to 2.5 kPa. Thus, a crystalline vinyl resin (B-2) was obtained.

<Production Example 7> [Production of Crystalline Vinyl Resin (B-3)]

An autoclave was charged with xylene (18.3 parts). After nitrogen purging, the autoclave was heated to 170° C. in a sealed state under stirring. A mixed solution of behenyl acrylate (80.0 parts), vinyl acetate (Japan Vam & Poval Co., Ltd., hereinafter the same) (10.0 parts), acrylonitrile (10.0 parts), Perbutyl D (0.2 parts), and xylene (13.3 parts) was dropped to the autoclave over three hours for polymerization while the internal temperature of the autoclave was controlled to stay at 170° C. After dropping, the drop line was washed with xylene (1.7 parts). The autoclave was maintained at the same temperature for 0.5 hours. Since the reaction rate of the monomer (a) was lower than 98% when checked, Perbutyl D (0.1 parts) was further added to the autoclave to continue the reaction until the reaction rate reached 98% or higher. The solvent was removed at 170° C. for three hours under a reduced pressure of 0.5 to 2.5 kPa. Thus, a crystalline vinyl resin (B-3) was obtained.

<Production Example 8> [Production of Crystalline Vinyl Resin (B-4)]

An autoclave was charged with xylene (18.3 parts). After nitrogen purging, the autoclave was heated to 170° C. in a sealed state under stirring. A mixed solution of stearyl acrylate (Kyoeisha Chemical Co., Ltd., hereinafter the same) (80.0 parts), styrene (10.0 parts), acrylonitrile (10.0 parts), Perbutyl D (1 part), and xylene (13.3 parts) was dropped to the autoclave over three hours for polymerization while the internal temperature of the autoclave was controlled to stay at 170° C. After dropping, the drop line was washed with xylene (1.7 parts). The autoclave was further maintained at the same temperature for 0.5 hours. Since the reaction rate of the monomer (a) was lower than 98% when checked, Perbutyl D (0.3 parts) was further added to the autoclave to continue the reaction until the reaction rate reached 98% or higher. The solvent was removed at 170° C. for three hours under a reduced pressure of 0.5 to 2.5 kPa. Thus, a crystalline vinyl resin (B-4) was obtained.

<Production Example 9> [Production of Crystalline Vinyl Resin (B-5)]

An autoclave was charged with xylene (18.3 parts). After nitrogen purging, the autoclave was heated to 170° C. in a sealed state under stirring. A mixed solution of behenyl acrylate (60.0 parts), styrene (7.5 parts), vinyl acetate (10.0 parts), acrylic acid (Mitsubishi Chemical Corporation) (2.5 parts), acrylonitrile (20.0 parts), Perbutyl D (0.2 parts), and xylene (13.3 parts) was dropped to the autoclave over three hours for polymerization while the internal temperature of the autoclave was controlled to stay at 170° C. After dropping, the drop line was washed with xylene (1.7 parts). The autoclave was further maintained at the same temperature for 0.5 hours. Since the reaction rate of the monomer (a) was lower than 98% when checked, Perbutyl D (0.1 parts) was further added to the autoclave to continue the reaction until the reaction rate reached 98% or higher. The solvent was removed at 170° C. for three hours under a reduced pressure of 0.5 to 2.5 kPa. Thus, a crystalline vinyl resin (B-5) was obtained.

<Production Example 10> [Production of Crystalline Vinyl Resin (B-6)]

An autoclave was charged with xylene (18.3 parts). After nitrogen purging, the autoclave was heated to 170° C. in a sealed state under stirring. A mixed solution of behenyl acrylate (50.0 parts), styrene (10.0 parts), vinylacetate (20.0 parts), acrylonitrile (20.0 parts), Perbutyl D (1 part), and xylene (13.3 parts) was dropped to the autoclave over three hours for polymerization while the internal temperature of the autoclave was controlled to stay at 170° C. After dropping, the drop line was washed with xylene (1.7 parts). The autoclave was further maintained at the same temperature for 0.5 hours. Since the reaction rate of the monomer (a) was lower than 98% when checked, Perbutyl D (0.3 parts) was further added to the autoclave to continue the reaction until the reaction rate reached 98% or higher. The solvent was removed at 170° C. for three hours under a reduced pressure of 0.5 to 2.5 kPa. Thus, a crystalline vinyl resin (B-6) was obtained.

<Production Example 11> [Production of Crystalline Vinyl Resin (B-7)]

An autoclave was charged with xylene (18.3 parts). After nitrogen purging, the autoclave was heated to 170° C. in a sealed state under stirring. A mixed solution of behenyl acrylate (30.0 parts), vinyl acetate (70.0 parts), Perbutyl D (2 parts), and xylene (13.3 parts) was dropped to the autoclave over three hours for polymerization while the internal temperature of the autoclave was controlled to stay at 170° C. After dropping, the drop line was washed with xylene (1.7 parts). The autoclave was further maintained at the same temperature for 0.5 hours. Since the reaction rate of the monomer (a) was lower than 98% when checked, Perbutyl D (0.5 parts) was further added to the autoclave to continue the reaction until the reaction rate reached 98% or higher. The solvent was removed at 170° C. for three hours under a reduced pressure of 0.5 to 2.5 kPa. Thus, a crystalline vinyl resin (B-7) was obtained.

<Production Example 12> [Synthesis of Triacontyl Acrylate]

A reaction vessel equipped with a stirrer, a heating and cooling device, a thermometer, an air inlet tube, a decompressor, and a water reduction device was charged with 1-triacontanol (50 parts), toluene (50 parts), acrylic acid (12 parts), and hydroquinone (0.05 parts), followed by stirring for homogenization. Subsequently, para-toluene sulfonic acid (2 parts) was added and the mixture was stirred for 30 minutes. Then, the mixture was reacted at 100° C. for five hours while blowing air into the mixture at a flow rate of 30 mL/min and while generated water was removed. Subsequently, the pressure in the reaction vessel was adjusted to 300 mmHg, and the reaction was further continued for three hours while generated water was removed. After cooling the reaction solution to room temperature, a 10 wt % aqueous solution of sodium hydroxide (30 parts) was added to the reaction solution, followed by stirring for one hour. Then the reaction solution was left to stand to separate the organic phase and the aqueous phase. The organic phase was collected by liquid separation and centrifugation. Hydroquinone (0.01 parts) was added and the solvent was removed at reduced pressure while air was blown thereinto. Thus, triacontyl acrylate was obtained.

<Production Example 13> [Production of Crystalline Vinyl Resin (B-8)]

An autoclave was charged with xylene (18.3 parts). After nitrogen purging, the autoclave was heated to 170° C. in a sealed state under stirring. A mixed solution of the triacontyl acrylate (80.0 parts) obtained in Production Example 12, vinyl acetate (10.0 parts), acrylonitrile (10.0 parts), Perbutyl D (0.2 parts), and xylene (13.3 parts) was dropped to the autoclave over three hours for polymerization while the internal temperature of the autoclave was controlled to stay at 170° C. After dropping, the drop line was washed with xylene (1.7 parts). The autoclave was further maintained at the same temperature for 0.5 hours. Since the reaction rate of the monomer (a) was lower than 98% when checked, Perbutyl D (0.1 parts) was further added to the autoclave to continue the reaction until the reaction rate reached 98% or higher. The solvent was removed at 170° C. for three hours under a reduced pressure of 0.5 to 2.5 kPa. Thus, a crystalline vinyl resin (B-8) was obtained.

<Production Example 14> [Production of Crystalline Vinyl Resin (B-9)]

An autoclave was charged with toluene (30 parts). After nitrogen purging, the autoclave was heated to 60° C. in a sealed state under stirring. A mixed solution of behenyl acrylate (40.0 parts), methacrylonitrile (Nacalai Tesque, Inc., hereinafter the same) (25.0 parts), vinyl acetate (25.0 parts), 2-hydroxyethyl methacrylate (Nacalai Tesque, Inc., hereinafter the same) (10.0 parts), perbutyl O (t-butylperoxy-2-ethylhexanoate) (1.0 part), and toluene (60.0 parts) was dropped to the autoclave over three hours for polymerization while the internal temperature of the autoclave was controlled to stay at 95° C. After dropping, the drop line was washed with toluene (10 parts). The autoclave was further maintained at the same temperature for 10 hours. Since the reaction rate of the monomer (a) was lower than 98% when checked, perbutyl O (1.0 part) was further added to the autoclave to continue the reaction until the reaction rate reached 98% or higher. The solvent was removed at 170° C. for three hours under a reduced pressure of 0.5 to 2.5 kPa. Thus, a crystalline vinyl resin (B-9) was obtained.

<Production Example 15> [Production of Crystalline Vinyl Resin (B-10)]

An autoclave was charged with toluene (30 parts). After nitrogen purging, the autoclave was heated to 60° C. in a sealed state under stirring. A mixed solution of behenyl acrylate (60.0 parts), styrene (10.0 parts), acrylonitrile (5.0 parts), vinyl acetate (20.0 parts), acrylic acid (Nippon Shokubai Co., Ltd., hereinafter the same) (5.0 parts), 2,2'-azobis(2,4-dimethylvaleronitrile) (FUJIFILM Wako Pure Chemical Corporation, hereinafter the same) (1.0 part), and toluene (60.0 parts) was dropped to the autoclave over three hours for polymerization while the internal temperature of the autoclave was controlled to stay at 60° C. After dropping, the drop line was washed with toluene (10 parts). The autoclave was further maintained at the same temperature for 10 hours. Since the reaction rate of the monomer (a) was lower than 98% when checked, 2,2'-azobis(2,4-dimethylvaleronitrile) (1.0 part) was further added to the autoclave to continue the reaction until the reaction rate reached 98% or higher. The solvent was removed at 120° C. for six hours under a reduced pressure of 0.5 to 2.5 kPa. Thus, a crystalline vinyl resin (B-10) was obtained.

<Production Example 16> [Production of Crystalline Vinyl Resin (B-11)]

An autoclave was charged with toluene (30 parts). After nitrogen purging, the autoclave was heated to 60° C. in a sealed state under stirring. A mixed solution of behenyl acrylate (60.0 parts), styrene (25.0 parts), methacrylic acid (5.0 parts), acrylonitrile (10.0 parts), 2,2'-azobis(2,4-dimethylvaleronitrile) (1.0 part), and toluene (60.0 parts) was dropped to the autoclave over three hours for polymerization while the internal temperature of the autoclave was controlled to stay at 60° C. After dropping, the drop line was washed with toluene (10.0 parts). The autoclave was further maintained at the same temperature for 10 hours. Since the reaction rate of the monomer (a) was lower than 98% when checked, 2,2'-azobis(2,4-dimethylvaleronitrile) (1.0 part) was further added to the autoclave to continue the reaction until the reaction rate reached 98% or higher. The solvent was removed at 120° C. for six hours under a reduced pressure of 0.5 to 2.5 kPa. Thus, a crystalline vinyl resin (B-11) was obtained.

<Comparative Production Example 1> [Production of Crystalline Vinyl Resin (B'-1)]

An autoclave was charged with xylene (18.3 parts). After nitrogen purging, the autoclave was heated to 170° C. in a sealed state under stirring. A mixed solution of stearyl acrylate (60.0 parts), styrene (20.0 parts), acrylonitrile (20.0 parts), Perbutyl D (0.3 parts), and xylene (13.3 parts) was dropped to the autoclave over three hours for polymerization while the internal temperature of the autoclave was controlled to stay at 170° C. After dropping, the drop line was washed with xylene (1.7 parts). The autoclave was further maintained at the same temperature for 0.5 hours. Since the reaction rate of the monomer (a) was lower than 98% when checked, Perbutyl D (0.1 parts) was further added to the autoclave to continue the reaction until the reaction rate reached 98% or higher. The solvent was removed at 170° C. for three hours under a reduced pressure of 0.5 to 2.5 kPa. Thus, a crystalline vinyl resin (B'-1) was obtained.

<Comparative Production Example 2> [Production of Crystalline Vinyl Resin (B'-2)]

An autoclave was charged with xylene (18.3 parts). After nitrogen purging, the autoclave was heated to 170° C. in a sealed state under stirring. A mixed solution of stearyl acrylate (49.0 parts), styrene (31.0 parts), acrylonitrile (20.0 parts), Perbutyl D (0.9 parts), and xylene (13.3 parts) was dropped to the autoclave over three hours for polymerization while the internal temperature of the autoclave was controlled to stay at 170° C. After dropping, the drop line was washed with xylene (1.7 parts). The autoclave was further maintained at the same temperature for 0.5 hours. Since the reaction rate of the monomer (a) was lower than 98% when checked, Perbutyl D (0.2 parts) was further added to the autoclave to continue the reaction until the reaction rate reached 98% or higher. The solvent was removed at 170° C. for three hours under a reduced pressure of 0.5 to 2.5 kPa. Thus, a crystalline vinyl resin (B'-2) was obtained.

<Comparative Production Example 3> [Production of Crystalline Vinyl Resin (B'-3)]

An autoclave was charged with xylene (18.3 parts). After nitrogen purging, the autoclave was heated to 170° C. in a sealed state under stirring. A mixed solution of behenyl acrylate (70.0 parts), butyl acrylate (30.0 parts), perbutyl O (0.5 parts), and xylene (13.3 parts) was dropped to the autoclave over three hours for polymerization while the internal temperature of the autoclave was controlled to stay at 170° C. After dropping, the drop line was washed with xylene (1.7 parts). The autoclave was further maintained at the same temperature for 0.5 hours. Since the reaction rate of the monomer (a) was lower than 98% when checked, perbutyl O (0.5 parts) was further added to the autoclave to continue the reaction until the rate reached 98% or higher. The solvent was removed at 170° C. for three hours under a reduced pressure of 0.5 to 2.5 kPa. Thus, a crystalline vinyl resin (B'-3) was obtained.

<Comparative Production Example 4> [Production of Crystalline Vinyl Resin (B'-4)]

An autoclave was charged with toluene (30 parts). After nitrogen purging, the autoclave was heated to 60° C. in a sealed state under stirring. A mixed solution of behenyl acrylate (60.0 parts), styrene (20.0 parts), methacrylic acid (10.0 parts), acrylonitrile (10.0 parts), 2,2'-azobis(2,4-dimethylvaleronitrile) (1.0 part), and toluene (60.0 parts) was dropped to the autoclave over three hours for polymerization while the internal temperature of the autoclave was controlled to stay at 60° C. After dropping, the drop line was washed with toluene (10.0 parts). The autoclave was further maintained at the same temperature for 10 hours. Since the reaction rate of the monomer (a) was lower than 98% when checked, 2,2'-azobis(2,4-dimethylvaleronitrile) (1.0 part) was further added to the autoclave to continue the reaction until the rate reached 98% or higher. The solvent was removed at 120° C. for six hours under a reduced pressure of 0.5 to 2.5 kPa. Thus, a crystalline vinyl resin (B'-4) was obtained.

Here, the reaction rate (%) of the monomer (a) was calculated by NMR, although it can be calculated by a method of quantifying residual monomers, such as NMR and GC.

<Measurement Conditions>
Device: AVANCE III HD400 available from Bruker Corporation Accumulation number: four times
Relaxation time: one second <Sample Preparation>
A sample (100 mg) and a deuterated solvent (e.g., deuterated chloroform) (0.8 mL) were added to an NMR tube to dissolve the resin.

<Analysis and Calculation>
The reaction rate was calculated from the following formula, based on the area of protons of the monomer (a) before reaction, the area of protons of the residual monomer (a), and the area of protons in terminal methyl groups of acyclic hydrocarbon groups of the monomer (a) and the crystalline vinyl resin (B).

Reaction rate: 100×[{Area of protons bonded to a carbon-carbon double bond of the monomer (a) before reaction/Area of protons in terminal methyl groups of acyclic hydrocarbon groups of the monomer (a) and the crystalline vinyl resin (B)}−{Area of protons bonded to double-bonded carbon of the residual monomer (a)/Area of protons in terminal methyl groups of acyclic hydrocarbon groups of the monomer (a) and the crystalline vinyl resin (B)}]/{Area of protons bonded to double-bonded carbon of the monomer (a) before reaction/Area of protons in terminal methyl groups of acyclic hydrocarbon groups of the monomer (a) and the crystalline vinyl resin (B)}

For example, when the monomer (a) was behenyl acrylate, protons (about 6.4 ppm) bonded to the double-bonded carbon and protons (about 0.9 ppm) in terminal methyl groups of acyclic hydrocarbon groups were used.

Table 3 shows physical property values of the crystalline vinyl resins (B-1) to (B-11) and (B'-1) to (B'-4). The endothermic peak top temperature, half-width of the endothermic peak, and amount of endothermic heat Q1 based on the endothermic peak of the crystalline vinyl resin (B) were measured by the following method.

The endothermic peak top temperature was measured using a differential scanning calorimeter (DSC Q20, TA Instruments) The crystalline vinyl resin (B) was heated from 20° C. to 150° C. at 10° C./min for first heating; cooled from 150° C. to 0° C. at 10° C./min; and then heated from 0° C. to 150° C. at 10° C./min for second heating. The endothermic peak top temperature during the second heating was determined as the endothermic peak top temperature of the crystalline vinyl resin (B).

The amount of endothermic heat based on the endothermic peak during the second heating in the differential scanning calorimeter was determined as the amount of endothermic heat Q1 based on the endothermic peak.

Based on a DSC curve obtained from the measurement of the endothermic peak top temperature, the temperature width of the peak at half the maximum peak height from the base line of the endothermic peak was determined as the half-width of the endothermic peak.

TABLE 3

| | | | Crystalline vinyl resin (B) | | | | |
|---|---|---|---|---|---|---|---|
| | | | Production Example 5 (B-1) | Production Example 6 (B-2) | Production Example 7 (B-3) | Production Example 8 (B-4) | Production Example 9 (B-5) |
| Composition (parts by weight) | Monomer (a) | Behenyl acrylate (a1) | 64.0 | 60.0 | 80.0 | — | 60.0 |
| | | Stearyl acrylate (a2) | — | — | — | 80.0 | — |
| | | Triacontyl acrylate (a3) | — | — | — | — | — |

TABLE 3-continued

| | | | Crystalline vinyl resin (B) | | | | |
|---|---|---|---|---|---|---|---|
| Composition (parts by weight) | Monomer (b) | Styrene (b1) | 16.7 | 10.0 | — | 10.0 | 7.5 |
| | | Acrylic acid (b2-1) | — | — | — | — | 2.5 |
| | | Vinyl acetate (b3) | — | — | 10.0 | — | 10.0 |
| | | Butyl acrylate (b2-2) | — | — | — | — | — |
| | | Methacrylic acid (b2-3) | — | — | — | — | — |
| | | 2-Hydroxy-ethyl methacrylate (b2-4) | — | — | — | — | — |
| | Monomer (d) | Acrylonitrile (d1-1) | 16.7 | 30.0 | 10.0 | 10.0 | 20.0 |
| | | Reaction compound of 2-iso-cyanatoethyl methacrylate and methanol (d2) | 2.5 | — | — | — | — |
| | | Methacrylo-nitrile (d1-2) | | | | | |
| | Radical initiator (c) | t-Butyl peroxy-2-ethyl-hexanoate (c2-1) | 0.5 | — | — | — | — |
| | | Di-t-butyl peroxide (c2-2) | — | 4.5 | 0.3 | 1.3 | 0.3 |
| | | 2,2'-Azobis(2,4-dimethyl-valeronitrile) (c3) | — | — | — | — | — |
| Weight percent of (a) among monomers constituting (B) (wt %) | | | 64 | 60 | 80 | 80 | 60 |
| Analysis value | Endothermic peak top temperature (° C.) | | 64 | 61 | 68 | 46 | 63 |
| | Half-width of the endothermic peak (° C.) | | 5 | 5 | 3 | 6 | 6 |
| | Amount of endothermic heat Q1 based on endothermic peak (J/g) | | 51 | 14 | 78 | 30 | 20 |
| | Acid value (mg KOH/g) | | 0 | 0 | 0 | 0 | 17 |
| | Weight average molecular weight | | 110,000 | 5,000 | 17,000 | 9,000 | 21,000 |
| SP(B) (cal/cm$^3$)$^{0.5}$ | | | 10.4 | 10.7 | 9.6 | 9.7 | 10.4 |

| | | | Production Example 10 (B-6) | Production Example 11 (B-7) | Production Example 13 (B-8) | Production Example 14 (B-9) | Production Example 15 (B-10) |
|---|---|---|---|---|---|---|---|
| Composition (parts by weight) | Monomer (a) | Behenyl acrylate (a1) | 50.0 | 30.0 | — | 40.0 | 60.0 |
| | | Stearyl acrylate (a2) | — | — | — | — | — |
| | | Triacontyl acrylate (a3) | — | — | 80.0 | — | — |

TABLE 3-continued

|  |  |  |  |  |  |  |  |
|---|---|---|---|---|---|---|---|
| Crystalline vinyl resin (B) | | | | | | | |
| Monomer (b) | Styrene (b1) | 10.0 | — | — | — | 10.0 |
| | Acrylic acid (b2-1) | — | — | — | — | 5.0 |
| | Vinyl acetate (b3) | 20.0 | 70.0 | 10.0 | 25.0 | 20.0 |
| | Butyl acrylate (b2-2) | — | — | — | — | — |
| | Methacrylic acid (b2-3) | — | — | — | — | — |
| | 2-Hydroxy-ethyl methacrylate (b2-4) | — | — | — | 10.0 | — |
| Monomer (d) | Acrylonitrile (d1-1) | 20.0 | — | 10.0 | — | 5.0 |
| | Reaction compound of 2-iso-cyanatoethyl methacrylate and methanol (d2) | — | — | — | — | — |
| | Methacrylo-nitrile (d1-2) | | | — | 25.0 | — |
| Radical initiator (c) | t-Butyl peroxy-2-ethyl-hexanoate (c2-1) | — | — | — | 2.0 | — |
| | Di-t-butyl peroxide (c2-2) | 1.3 | 2.5 | 0.3 | — | — |
| | 2,2'-Azobis(2,4-dimethyl-valeronitrile) (c3) | — | — | — | — | 2.0 |
| Weight percent of (a) among monomers constituting (B) (wt %) | | 50 | 30 | 80 | 40 | 60 |
| Analysis value | Endothermic peak top temperature (° C.) | 62 | 60 | 89 | 57 | 62 |
| | Half-width of the endothermic peak (° C.) | 4 | 4 | 3 | 4 | 2 |
| | Amount of endothermic heat Q1 based on endothermic peak (J/g) | 15 | 10 | 90 | 30 | 30 |
| | Acid value (mg KOH/g) | 0 | 0 | 0 | 0 | 40 |
| | Weight average molecular weight | 10,000 | 7,000 | 14,000 | 15,000 | 25,000 |
| SP(B) (cal/cm³)⁰·⁵ | | 10.5 | 10.1 | 9.6 | 10.7 | 9.9 |

|  |  |  | Production Example 16 (B-11) | Comparative Production Example 1 (B'-1) | Comparative Production Example 2 (B'-2) | Comparative Production Example 3 (B'-3) | Comparative Production Example 4 (B'-4) |
|---|---|---|---|---|---|---|---|
| Composition (parts by weight) | Monomer (a) | Behenyl acrylate (a1) | 60.0 | — | — | 70.0 | 60.0 |
| | | Stearyl acrylate (a2) | — | 60.0 | 49.0 | — | — |
| | | Triacontyl acrylate (a3) | — | — | — | — | — |

TABLE 3-continued

| | | | Crystalline vinyl resin (B) | | | | |
|---|---|---|---|---|---|---|---|
| Monomer (b) | Styrene (b1) | 25.0 | 20.0 | 31.0 | — | 20.0 |
| | Acrylic acid (b2-1) | — | — | — | — | — |
| | Vinyl acetate (b3) | — | — | — | — | — |
| | Butyl acrylate (b2-2) | — | — | — | 30.0 | — |
| | Methacrylic acid (b2-3) | 5.0 | — | — | — | 10.0 |
| | 2-Hydroxy-ethyl methacrylate (b2-4) | — | — | — | — | — |
| Monomer (d) | Acrylonitrile (d1-1) | 10.0 | 20.0 | 20.0 | — | 10.0 |
| | Reaction compound of 2-iso-cyanatoethyl methacrylate and methanol (d2) | — | — | — | — | — |
| | Methacrylo-nitrile (d1-2) | — | — | — | — | — |
| Radical initiator (c) | t-Butyl peroxy-2-ethyl-hexanoate (c2-1) | — | — | — | 1.0 | — |
| | Di-t-butyl peroxide (c2-2) | — | 0.4 | 1.1 | — | — |
| | 2,2'-Azobis(2,4-dimethyl-valeronitrile) (c3) | 2.0 | — | — | — | 2.0 |
| Weight percent of (a) among monomers constituting (B) (wt %) | | 60 | 60 | 49 | 70 | 60 |
| Analysis value | Endothermic peak top temperature (° C.) | 65 | 45 | 39 | 60 | 68 |
| | Half-width of the endothermic peak (° C.) | 2 | 8 | 6 | 7 | 3 |
| | Amount of endothermic heat Q1 based on endothermic peak (J/g) | 20 | 10 | 4 | 40 | 30 |
| | Acid value (mg KOH/g) | 30 | 0 | 0 | 0 | 62 |
| | Weight average molecular weight | 60,000 | 25,000 | 11,000 | 30,000 | 70,000 |
| SP(B) (cal/cm$^3$)$^{0.5}$ | | 10.1 | 10.4 | 10.6 | 9.2 | 10.2 |

<Example 1> [Production of Toner Binder (C-1)]

The amorphous resin (A-1) (90 parts) and the crystalline vinyl resin (B-1) (10 parts) were mixed and kneaded by a twin-screw kneader (PCM-30, Ikegai Corporation], and the resulting product was cooled. Thus, a toner binder (C-1) of the present invention was obtained.

<Examples 2 to 18> [Production of Toner Binders (C-2) to (C-18)]

The amorphous resin (A) and the crystalline vinyl resin (B) in the amounts (parts by weight) shown in Table 4 were mixed, and toner binders (C-2) to (C-18) of the present invention were obtained as in Example 1.

<Comparative Examples 1 to 6> [Production of Toner Binders (C'-1) to (C'-6)]

The amorphous resin (A) and the crystalline vinyl resin (B) or (B') in the amounts (parts by weight) shown in Table 4 were mixed, and toner binders (C'-1) to (C'-6) were obtained as in Example 1. Each of the toner binders (C'-1) and (C'-5) had a large half-width of the endothermic peak. The toner binder (C'-2) had a low endothermic peak top temperature. The toner binder (C'-3) contained a small amount of the crystalline vinyl resin (B). The toner binder (C'-4) contained a large amount of the crystalline vinyl resin (B). The toner binder (C'-6) contained the crystalline vinyl resin (B) having a high acid value.

Table 4 shows analysis values of the toner binders. The endothermic peak top temperature, half-width of the endothermic peak, and amount of endothermic heat Q1 based on the endothermic peak were measured by the following method.

The endothermic peak top temperature of the toner binder was measured using a differential scanning calorimeter (DSC20, TA Instruments) The toner binder was heated from 20° C. to 150° C. at 10° C./min for first heating; cooled from 150° C. to 0° C. at 10° C./min; and then heated from 0° C. to 150° C. at 10° C./min for second heating. The temperature of the endothermic peak derived from the crystalline vinyl resin (B) during the second heating was determined as the endothermic peak top temperature.

The amount of endothermic heat based on the endothermic peak derived from the crystalline vinyl resin (B) during the second heating in the differential scanning calorimeter was determined as the amount of endothermic heat Q1 based on the endothermic peak.

The half-width of the endothermic peak is the half-width of the endothermic peak derived from the crystalline vinyl resin (B) of the toner binder. Based on a DSC curve obtained from the measurement of the endothermic peak top temperature, the temperature width of the peak at half the maximum peak height from the base line of the endothermic peak was determined as the half-width of the endothermic peak.

TABLE 4

| | | | Toner binder (C) | | | | | | | | | | | |
|---|---|---|---|---|---|---|---|---|---|---|---|---|---|---|
| | | | Examples | | | | | | | | | | | |
| | | | 1 (C-1) | 2 (C-2) | 3 (C-3) | 4 (C-4) | 5 (C-5) | 6 (C-6) | 7 (C-7) | 8 (C-8) | 9 (C-9) | 10 (C-10) | 11 (C-11) | 12 (C-12) |
| Composition (parts by weight) | Amorphous resin (A) | (A-1) | 90 | 90 | — | — | — | — | — | — | — | — | — | — |
| | | (A-2) | — | — | 90 | 90 | — | — | — | — | — | 81 | 90 | 90 |
| | | (A-3) | — | — | — | — | 90 | 90 | 90 | 90 | 97 | — | — | — |
| | | (A-4) | — | — | — | — | — | — | — | — | — | — | — | — |
| | Crystalline vinyl resin (B) | (B-1) | 10 | — | — | — | 10 | — | — | — | — | — | — | — |
| | | (B-2) | — | 10 | — | — | — | 10 | — | — | — | — | — | — |
| | | (B-3) | — | — | 10 | — | — | — | 10 | — | 3 | 19 | — | — |
| | | (B-4) | — | — | — | 10 | — | — | — | 10 | — | — | — | — |
| | | (B-5) | — | — | — | — | — | — | — | — | — | — | 10 | — |
| | | (B-6) | — | — | — | — | — | — | — | — | — | — | — | 10 |
| | | (B-7) | — | — | — | — | — | — | — | — | — | — | — | — |
| | | (B-8) | — | — | — | — | — | — | — | — | — | — | — | — |
| | | (B-9) | — | — | — | — | — | — | — | — | — | — | — | — |
| | | (B-10) | — | — | — | — | — | — | — | — | — | — | — | — |
| | | (B-11) | — | — | — | — | — | — | — | — | — | — | — | — |
| | | (B'-1) | — | — | — | — | — | — | — | — | — | — | — | — |
| | | (B'-2) | — | — | — | — | — | — | — | — | — | — | — | — |
| | | (B'-3) | — | — | — | — | — | — | — | — | — | — | — | — |
| | | (B'-4) | — | — | — | — | — | — | — | — | — | — | — | — |
| Analysis value | Glass transition temperature ($Tg_T$) (° C.) | | 62 | 61 | 60 | 59 | 56 | 55 | 57 | 57 | 57 | 59 | 60 | 61 |
| | Flow starting temperature Tfb(C) (° C.) | | 89 | 85 | 88 | 86 | 74 | 67 | 78 | 77 | 84 | 68 | 83 | 86 |
| | Endothermic peak top temperature (° C.) | | 63 | 60 | 67 | 44 | 62 | 60 | 66 | 44 | 67 | 65 | 60 | 60 |
| | Half-width of the endothermic peak (° C.) | | 5 | 5 | 3 | 6 | 6 | 6 | 3 | 6 | 3 | 3 | 6 | 4 |
| | Amount of endothermic heat Q1 based on endothermic peak (J/g) | | 5 | 1 | 7 | 3 | 4 | 1 | 7 | 3 | 2 | 15 | 2 | 1 |
| | Acid value (mg KOH/g) | | 5 | 5 | 20 | 20 | 10 | 10 | 10 | 10 | 11 | 18 | 22 | 20 |
| | Tfb(A) − Tfb(C) (° C.) | | 10 | 14 | 9 | 11 | 13 | 20 | 9 | 10 | 3 | 29 | 14 | 11 |
| \| SP(A) − SP(B) \| $(cal/cm^3)^{0.5}$ | | | 1.5 | 1.2 | 1.6 | 1.5 | 0.7 | 0.4 | 1.5 | 1.4 | 1.5 | 1.6 | 0.8 | 0.7 |

| | | | Examples | | | | | | Comparative Examples | | | | | |
|---|---|---|---|---|---|---|---|---|---|---|---|---|---|---|
| | | | 13 (C-13) | 14 (C-14) | 15 (C-15) | 16 (C-16) | 17 (C-17) | 18 (C-18) | 1 (C'-1) | 2 (C'-2) | 3 (C'-3) | 4 (C'-4) | 5 (C'-5) | 6 (C'-6) |
| Composition (parts by weight) | Amorphous resin (A) | (A-1) | 90 | — | 90 | 90 | 90 | — | — | — | 98 | — | — | — |
| | | (A-2) | — | 90 | — | — | — | — | 90 | 90 | — | 75 | 90 | 90 |
| | | (A-3) | — | — | — | — | — | — | — | — | — | — | — | — |
| | | (A-4) | — | — | — | — | — | 90 | — | — | — | — | — | — |
| | Crystalline vinyl resin (B) | (B-1) | — | — | — | — | — | — | — | — | — | — | — | — |
| | | (B-2) | — | — | — | — | — | — | — | — | — | 25 | — | — |
| | | (B-3) | — | — | — | — | — | 10 | — | — | 2 | — | — | — |
| | | (B-4) | — | — | — | — | — | — | — | — | — | — | — | — |
| | | (B-5) | — | — | — | — | — | — | — | — | — | — | — | — |
| | | (B-6) | — | — | — | — | — | — | — | — | — | — | — | — |
| | | (B-7) | 10 | — | — | — | — | — | — | — | — | — | — | — |
| | | (B-8) | — | 10 | — | — | — | — | — | — | — | — | — | — |
| | | (B-9) | — | — | 10 | — | — | — | — | — | — | — | — | — |

TABLE 4-continued

| | | Toner binder (C) | | | | | | | | | | | |
|---|---|---|---|---|---|---|---|---|---|---|---|---|---|
| | (B-10) | — | — | — | 10 | — | — | — | — | — | — | — | — |
| | (B-11) | — | — | — | — | 10 | — | — | — | — | — | — | — |
| | (B'-1) | — | — | — | — | — | — | 10 | — | — | — | — | — |
| | (B'-2) | — | — | — | — | — | — | — | 10 | — | — | — | — |
| | (B'-3) | — | — | — | — | — | — | — | — | — | — | 10 | — |
| | (B'-4) | — | — | — | — | — | — | — | — | — | — | — | 10 |
| Analysis value | Glass transition temperature (Tg$_T$) (° C.) | 63 | 61 | 62 | 62 | 61 | 55 | 59 | 59 | 63 | 59 | 60 | 61 |
| | Flow starting temperature Tfb(C) (° C.) | 91 | 90 | 84 | 83 | 84 | 75 | 85 | 83 | 97 | 66 | 85 | 83 |
| | Endothermic peak top temperature (° C.) | 59 | 88 | 56 | 60 | 63 | 67 | 43 | 38 | 67 | 59 | 60 | 60 |
| | Half-width of the endothermic peak (° C.) | 5 | 3 | 4 | 2 | 2 | 3 | 9 | 6 | 3 | 6 | 7 | 2 |
| | Amount of endothermic heat Q1 based on endothermic peak (J/g) | 1 | 9 | 2 | 3 | 3 | 4 | 1 | 0.3 | 0.2 | 1 | 4 | 3 |
| | Acid value (mg KOH/g) | 5 | 20 | 5 | 9 | 9 | 1 | 20 | 20 | 6 | 17 | 20 | 24 |
| | Tfb(A) − Tfb(C) (° C.) | 8 | 7 | 15 | 16 | 15 | 25 | 12 | 14 | 2 | 31 | 14 | 16 |
| \| SP(A) − SP(B) \| (cal/cm$^3$)$^{0.5}$ | | 1.8 | 1.6 | 1.2 | 2.0 | 1.8 | 1.0 | 0.8 | 0.6 | 2.3 | 0.5 | 2.0 | 1.0 |

<Example 19> [Production of Toner (T-1)]

Carbon black as a pigment (MA-100, Mitsubishi Chemical Corporation) (8 parts), carnauba wax as a release agent (carnauba wax, Nippon Wax Co., Ltd.) (4 parts), and a charge control agent (Eisen Spiron Black T-77, Hodogaya Chemical Co., Ltd.) (2 parts) were added to the toner binder (C-1) (85 parts) to obtain a toner by the following method.

First, the components were pre-mixed using a Henschel mixer, and then kneaded using a twin-screw kneader (PCM-30, Ikegai Corporation). Subsequently, after the kneaded mixture was finely ground with a jet mill (KJ-25, Kurimoto Ltd.), the resultant particles were classified by an elbow jet classifier (EJ-L-3 (LABO) model, Matsubo Corporation) to obtain toner particles having a volume average particle size of 7 μm.

Next, the toner particles (99 parts) were mixed with hydrophobic silica as a fluidizer (Aerosil R972, Nippon Aerosil Co., Ltd.) (1 part) in a sample mill. Thus, a toner (T-1) of the present invention was obtained.

<Examples 20 to 36> [Production of Toners (T-2) to (T-18)]

Toners were produced as in Example 19 with the amounts (parts by weight) of the raw materials shown in Tables 5 and 6. Thus, toners (T-2) to (T-18) of the present invention were obtained.

<Comparative Examples 7 to 12> [Production of Toners (T'-1) to (T'-6)]

Toners were produced as in Example 16 with the amounts (parts by weight) of the raw materials shown in Table 6. Thus, toners (T'-1) to (T'-6) were obtained.

<Example 37> [Production of Toner (T-19)]

[Production of Release Agent Dispersion]

A reaction vessel equipped with a condenser, a thermometer, and a stirrer was charged with carnauba wax as a release agent (carnauba wax, Nippon Wax Co., Ltd.) (15 parts) and ethyl acetate (85 parts). The carnauba was dissolved by heating at 80° C., and cooled to 30° C. over one hour to crystallize the carnauba wax into fine particles, followed by wet grinding by Ultravisco-Mill (model UVM-5, Aimex Co., Ltd.). Thus, a release agent dispersion was obtained.

[Production of Fine Particle Dispersion]

A reaction vessel equipped with a stirring rod and a thermometer were charged with water (683 parts), methacryloyloxy polyoxyethylene sodium sulfate (Eleminol RS-30, Sanyo Chemical Industries, Ltd.) (11 parts), styrene (139 parts), methacrylic acid (138 parts), butyl acrylate (184 parts), and ammonium persulfate (1 part), followed by stirring at 400 rev/min for 15 minutes. Thus, a white emulsion was obtained. The emulsion was heated to a system temperature of 75° C. and reacted for five hours. Further, a 1% aqueous solution of ammonium persulfate (30 parts) was added, followed by aging at 75° C. for five hours. Thus, an aqueous dispersion of a vinyl polymer (a copolymer of styrene-methacrylic acid-butyl acrylate-sodium salt of sulfate of an adduct of ethylene oxide with methacrylic acid with), namely a fine particle dispersion 1, was obtained. The fine particle dispersion 1 had a volume average particle size of 0.15 μm as measured by a laser diffraction/scattering type particle size distribution analyzer (LA-920, HORIBA, Ltd.).

[Production of Pigment Masterbatch]

Water (1200 parts), carbon black as a pigment (Regal 400R, Cabot Corporation) (40 parts), and the toner binder (C-1) (20 parts) produced in Example 1 were mixed with a Henschel mixer, and the mixture was kneaded with a triple roll mill at 90° C. for 30 minutes, followed by roll cooling and pulverization in a pulverizer. Thus, a pigment masterbatch was obtained.

[Production of Aqueous Phase]

A vessel equipped with a stirring rod was charged with water (955 parts), the fine particle dispersion 1 (5 parts), and an aqueous solution of sodium dodecyl diphenyl ether disulfonate (Eleminol MON7, Sanyo Chemical Industries, Ltd.) (30 parts). Thus, an aqueous phase in the form of a milky white liquid was obtained.

[Production of Toner (T-19)]

A beaker was charged with the toner binder (C-1) (191 parts), the pigment masterbatch (25 parts), the release agent dispersion (67 parts), and ethyl acetate (124 parts), followed by dissolution and homogeneous mixing. Thus, an oil phase was obtained. The aqueous phase (600 parts) was added to the oil phase, and dispersed using a TK homomixer (Tokushu Kika Kogyo Co., Ltd.) at a rotating speed of 12000 rpm at 25° C. for one minute, followed by solvent removal for 30 minutes using a film evaporator at a decompression degree of −0.05 MPa (gauge pressure), a temperature of 40° C., and a rotating speed of 100 rpm. Thus, an aqueous dispersion (X1) of resin particles containing the toner binder (C-1) was obtained.

The dispersion (X1) (100 parts) was centrifuged, and blended with water (60 parts) for further centrifugation for solid-liquid separation. This process was repeated twice, and the resulting product was dried at 35° C. for one hour. Subsequently, using an elbow jet classifier, fine particles and coarse particles were removed to obtain toner particles in which the amount of the fine particles having a size of 3.17 μm or less was 12% by number or less and the amount of the coarse particles having a size of 8.0 μm or more was 3% by volume or less.

Next, hydrophobic silica (Aerosil R972, Nippon Aerosil Co., Ltd.) (1 part) was added to the toner particles (99 parts) obtained. These components were mixed at a peripheral speed of 15 m/sec for 30 seconds in a sample mill, followed by a one-minute pause. This cycle was repeated five times. Thus, a toner (T-19) was obtained.

[Evaluation Method]

The following describes measurement methods and evaluation methods including criteria of the low-temperature fixability, hot offset resistance, grindability, image strength, heat-resistant storage stability, electrostatic charge stability, gloss-imparting properties, and durability of the toners (T-1) to (T-19) and (T'-1) to (T'-6) obtained. Tables 5 and 6 show evaluation results.

<Low-Temperature Fixability>

The toner was uniformly placed on paper at a coverage of 1.00 mg/cm$^2$. Here, the powder was placed on the paper using a printer with a thermal fixing device removed. This paper was passed between a soft roller and a heating roller at a fixing rate (peripheral speed of the heating roller) of 213 mm/sec with the heating roller temperature in increments of 5° C. in the range of 90° C. to 200° C. Then, the toner-fixed image was visually observed for occurrence of cold offset, and the cold offset occurrence temperature (MFT) was measured.

A lower cold offset occurrence temperature indicates better low-temperature fixability. Under the above evaluation conditions, preferably, the cold offset occurrence temperature is 125° C. or lower.

<Hot Offset Resistance (Hot Offset Occurrence Temperature)>

The toner was placed on paper by the same method as described above for the low-temperature fixability. This paper was passed between a soft roller and a heating roller at a fixing rate (peripheral speed of the heating roller) of 213 mm/sec with the heating roller temperature in increments of 5° C. in the range of 90° C. to 200° C. Then, the toner-fixed image was visually observed for occurrence of hot offset, and the hot offset occurrence temperature was measured.

A higher hot offset occurrence temperature indicates better hot offset resistance. Under the above evaluation conditions, preferably, the hot offset occurrence temperature is 180° C. or higher.

<Grindability>

Carbon black "MA-100" as a pigment (8 parts), carnauba wax as a release agent (4 parts), and a charge control agent "T-77" (2 parts) were added to each of the toner binders (C-1) to (C-18) and (C'-1) to (C'-6) (85 parts, each) used in the examples. These components were pre-mixed using a Henschel mixer, and then kneaded using a twin-screw kneader. After cooling, the kneaded mixture was ground and classified to a particle size capable of passing through 8.6 mesh and not capable of passing through 30 mesh to obtain particles for grindability evaluation. The particles for grindability evaluation were finely ground using a supersonic jet grinder "Labo Jet" under the following conditions.

Grinding pressure: 0.64 MPa

Grinding time: 15 min

Separator frequency: 150 Hz

Adjuster ring: 15 mm

Louver size: medium

The volume average particle size (μm) of the finely ground particles for grindability evaluation was measured without classifying the particles, by a Coulter counter (Multisizer III (product name), Beckman Coulter, Inc.). The grindability was evaluated. Tables 5 and 6 show the volume average particle sizes (μm) as evaluation results of grindability.

A smaller particle size indicates better grindability. Under the above evaluation conditions, preferably, the particle size is 8.0 μm or smaller.

<Image Strength>

An image fixed for evaluation of the low-temperature fixability was subjected to a manual scratch hardness test by applying a load of 10 g to a pencil fixed at an inclination of 45 degrees from directly above the pencil according to JIS K 5600-5-4 (1999). The image strength was evaluated based on the hardness of the pencil that did not scratch the image.

A higher pencil hardness indicates better image strength. Generally, a hardness of HB or higher is preferred.

<Heat-Resistant Storage Stability>

The toner (1 g) and hydrophobic silica (Aerosil R8200, Evonik Japan) (0.01 g) were mixed in a shaker for one hour. The mixture was placed in an airtight container and left to stand in an atmosphere of 40° C. and a humidity of 80% for 48 hours. The degree of blocking was visually observed, and the heat-resistant storage stability was evaluated according to the following criteria.

[Criteria]

Good: No blocking occurred.

Fair: Blocking occurred partially.

Poor: Blocking occurred entirely.

<Electrostatic Charge Stability>

(1) A 50-mL glass jar was charged with the toner (0.5 g) and a ferrite carrier (F-150, Powdertech Co., Ltd.) (20 g). The temperature and the relative humidity inside the glass jar were controlled at 23° C. and 50% for eight hours or longer.

(2) The glass jar was friction-stirred at 50 rpm for 10 minutes and for 120 minutes by a Turbula Shaker mixer. The electrostatic charge level was measured for each time period, using a blow-off electrostatic charge level measurement device (Kyocera Chemical Corporation).

A value of "electrostatic charge level after a friction time of 120 minutes/electrostatic charge level after a friction time of 10 minutes" was calculated using the above value and used as an index of the electrostatic charge stability. Tables 5 and 6 show "Electrostatic charge level after friction time of 120 minutes/electrostatic charge level after friction time of 10 minutes" as evaluation results of electrostatic charge stability.

A higher index indicates better electrostatic charge stability. Under the above evaluation conditions, preferably, the index is 0.7 or higher.

<Gloss-Imparting Properties>

The toner was placed on paper and fixed to the paper by the same method as described above for the low-temperature fixability. Then, thick white paper was placed under the toner-fixed paper, and the gloss degree (%) of the printed image was measured at an incident angle of 60 degrees using a glossmeter (IG-330, Horiba, Ltd.) for each increment of 5° C. in the range of the cold offset occurrence temperature (MFT) to the hot offset occurrence temperature. The highest glossiness (%) in the range was used as an index of the gloss-imparting properties of the toner. For example, when the glossiness is 10% at 120° C., 15% at 125° C., 20% at 130° C., and 18% at 135° C., the highest gloss degree is 20% at 130° C. Thus, the glossiness of 20% is used as the index. Tables 5 and 6 show the glossiness as the index of the gloss-imparting properties.

A higher glossiness indicates better gloss-imparting properties. Under the above evaluation conditions, preferably, the glossiness is 15% or higher.

<Durability>

Continuous copying was performed using the toner as a two-component developer by a monochrome copier (AR5030, Sharp Corporation). The durability was evaluated based on the following criteria.

[Criteria]

Excellent: Image quality stayed the same and no fog occurred after printing 10000 copies.

Good: Fog occurred after printing 10000 copies.

Fair: Fog occurred after printing 6000 copies.

Poor: Fog occurred after printing 2000 copies.

TABLE 5

| | | | | | Toner Examples | | | | | | |
|---|---|---|---|---|---|---|---|---|---|---|---|
| | | | | | 19 (T-1) | 20 (T-2) | 21 (T-3) | 22 (T-4) | 23 (T-5) | 24 (T-6) | 25 (T-7) |
| Toner (T) | Production method | | | | Grinding | Grinding | Grinding | Grinding | Grinding | Grinding | Grinding |
| | Composition (parts by weight) | Toner binder | Toner binder (C-1) | | 85 | — | — | — | — | — | — |
| | | | Toner binder (C-2) | | — | 85 | — | — | — | — | — |
| | | | Toner binder (C-3) | | — | — | 85 | — | — | — | — |
| | | | Toner binder (C-4) | | — | — | — | 85 | — | — | — |
| | | | Toner binder (C-5) | | — | — | — | — | 85 | — | — |
| | | | Toner binder (C-6) | | — | — | — | — | — | 85 | — |
| | | | Toner binder (C-7) | | — | — | — | — | — | — | 85 |
| | | | Toner binder (C-8) | | — | — | — | — | — | — | — |
| | | | Toner binder (C-9) | | — | — | — | — | — | — | — |
| | | | Toner binder (C-10) | | — | — | — | — | — | — | — |
| | | | Toner binder (C-11) | | — | — | — | — | — | — | — |
| | | | Toner binder (C-12) | | — | — | — | — | — | — | — |
| | | | Toner binder (C-13) | | — | — | — | — | — | — | — |
| | | Pigment | Carbon black MA-100 | | 8 | 8 | 8 | 8 | 8 | 8 | 8 |
| | | Charge control agent | T-77 | | 2 | 2 | 2 | 2 | 2 | 2 | 2 |
| | | Release agent | Carnauba wax | | 4 | 4 | 4 | 4 | 4 | 4 | 4 |
| | | Fluidizer | Aerosil R972 | | 1 | 1 | 1 | 1 | 1 | 1 | 1 |
| Results of properties | Low-temperature fixability (° C.) | | | | 110 | 105 | 105 | 105 | 100 | 90 | 100 |
| | Hot offset resistance (° C.) | | | | 190 | 190 | 190 | 190 | 185 | 180 | 185 |
| | Grindability (μm) | | | | 5.9 | 6.0 | 6.8 | 6.7 | 6.5 | 6.5 | 6.3 |
| | Image strength | | | | HB | HB | 2H | 2H | H | H | H |
| | Heat-resistant storage stability | | | | Good | Good | Good | Good | Good | Good | Good |
| | Electrostatic charge stability | | | | 0.9 | 0.9 | 0.9 | 0.9 | 0.9 | 0.9 | 0.9 |
| | Goss-imparting properties | | | | 18% | 19% | 15% | 15% | 20% | 22% | 18% |
| | Durability | | | | Good | Good | Excellent | Excellent | Good | Good | Excellent |
| | | | | | 26 (T-8) | 27 (T-9) | 28 (T-10) | 29 (T-11) | 30 (T-12) | 31 (T-13) | |
| Toner (T) | Production method | | | | Grinding | Grinding | Grinding | Grinding | Grinding | Grinding | |
| | Composition (parts by weight) | Toner binder | Toner binder (C-1) | | — | — | — | — | — | — | |
| | | | Toner binder (C-2) | | — | — | — | — | — | — | |
| | | | Toner binder (C-3) | | — | — | — | — | — | — | |

TABLE 5-continued

|  |  |  | Toner Examples | | | | | |
|---|---|---|---|---|---|---|---|---|
|  |  | Toner binder binder (C-4) | — | — | — | — | — | — |
|  |  | Toner binder (C-5) | — | — | — | — | — | — |
|  |  | Toner binder (C-6) | — | — | — | — | — | — |
|  |  | Toner binder (C-7) | — | — | — | — | — | — |
|  |  | Toner binder (C-8) | 85 | — | — | — | — | — |
|  |  | Toner binder (C-9) | — | 85 | — | — | — | — |
|  |  | Toner binder binder (C-10) | — | — | 85 | — | — | — |
|  |  | Toner binder (C-11) | — | — | — | 85 | — | — |
|  |  | Toner binder (C-12) | — | — | — | — | 85 | — |
|  |  | Toner binder (C-13) | — | — | — | — | — | 85 |
|  | Pigment | Carbon black MA-100 | 8 | 8 | 8 | 8 | 8 | 8 |
|  | Charge control agent | T-77 | 2 | 2 | 2 | 2 | 2 | 2 |
|  | Release agent | Carnauba wax | 4 | 4 | 4 | 4 | 4 | 4 |
|  | Fluidizer | Aerosil R972 | 1 | 1 | 1 | 1 | 1 | 1 |
| Results of properties | Low-temperature fixability (° C.) | | 100 | 105 | 90 | 105 | 105 | 120 |
|  | Hot offset resistance (° C.) | | 190 | 200 | 180 | 180 | 190 | 190 |
|  | Grindability (μm) | | 6.4 | 6.2 | 6.9 | 6.7 | 6.5 | 5.6 |
|  | Image strength | | H | 2H | HB | H | H | HB |
|  | Heat-resistant storage stability | | Good | Good | Good | Good | Good | Good |
|  | Electrostatic charge stability | | 0.9 | 0.9 | 0.8 | 0.9 | 0.9 | 0.9 |
|  | Goss-imparting properties | | 17% | 15% | 23% | 16% | 15% | 18% |
|  | Durability | | Excellent | Excellent | Good | Excellent | Excellent | Good |

TABLE 6

|  |  |  |  | Toner | | | | | |
|---|---|---|---|---|---|---|---|---|---|
|  |  |  |  | Examples | | | | | |
|  |  |  |  | 32 (T-14) | 33 (T-15) | 34 (T-16) | 35 (T-17) | 36 (T-18) | 37 (T-19) |
|  | Production method | | | Grinding | Grinding | Grinding | Grinding | Grinding | Dissolution suspension |
| Toner (T) | Composition (parts by weight) | Toner binder | Toner binder (C-1) | — | — | — | — | — | 88 |
|  |  |  | Toner binder (C-14) | 85 | — | — | — | — | — |
|  |  |  | Toner binder (C-15) | — | 85 | — | — | — | — |
|  |  |  | Toner binder binder (C-16) | — | — | 85 | — | — | — |
|  |  |  | Toner binder (C-17) | — | — | — | 85 | — | — |
|  |  |  | Toner binder (C-18) | — | — | — | — | 85 | — |
|  |  |  | Toner binder (C'-1) | — | — | — | — | — | — |
|  |  |  | Toner binder (C'-2) | — | — | — | — | — | — |
|  |  |  | Toner binder binder (C'-3) | — | — | — | — | — | — |
|  |  |  | Toner binder binder (C'-4) | — | — | — | — | — | — |

TABLE 6-continued

| | | | Toner | | | | | |
|---|---|---|---|---|---|---|---|---|
| | | Toner binder (C'-5) | — | — | — | — | — | — |
| | | Toner binder (C'-6) | — | — | — | — | — | — |
| | Pigment | Carbon black MA-100 | 8 | 8 | 8 | 8 | 8 | 7 |
| | Charge control agent | T-77 | 2 | 2 | 2 | 2 | 2 | — |
| | Release agent | Carnauba wax | 4 | 4 | 4 | 4 | 4 | 4 |
| | Fluidizer | Aerosil R972 | 1 | 1 | 1 | 1 | 1 | 1 |
| Results of properties | Low-temperature fixability (° C.) | | 110 | 110 | 105 | 105 | 105 | 105 |
| | Hot offset resistance (° C.) | | 200 | 200 | 190 | 200 | 180 | 200 |
| | Grindability (μm) | | 7.0 | 7.0 | 6.5 | 6.0 | 6.2 | 5.9 |
| | Image strength | | H | H | H | H | HB | HB |
| | Heat-resistant storage stability | | Good | Good | Good | Good | Good | Good |
| | Electrostatic charge stability | | 0.9 | 0.8 | 0.7 | 0.7 | 0.9 | 0.8 |
| | Goss-imparting properties | | 15% | 15% | 15% | 15% | 25% | 22% |
| | Durability | | Excellent | Excellent | Good | Excellent | Good | Excellent |

| | | | Comparative Examples | | | | | |
|---|---|---|---|---|---|---|---|---|
| | | | 7 (T'-1) | 8 (T'-2) | 9 (T'-3) | 10 (T'-4) | 11 (T'-5) | 12 (T'-6) |
| Toner (T) | Production method | | Grinding | Grinding | Grinding | Grinding | Grinding | Grinding |
| | Composition (parts by weight) | Toner binder (C-1) | — | — | — | — | — | — |
| | | Toner binder (C-14) | — | — | — | — | — | — |
| | | Toner binder (C-15) | — | — | — | — | — | — |
| | | Toner binder (C-16) | — | — | — | — | — | — |
| | | Toner binder (C-17) | — | — | — | — | — | — |
| | | Toner binder (C-18) | — | — | — | — | — | — |
| | | Toner binder (C'-1) | 85 | — | — | — | — | — |
| | | Toner binder (C'-2) | — | 85 | — | — | — | — |
| | | Toner binder (C'-3) | — | — | 85 | — | — | — |
| | | Toner binder (C'-4) | — | — | — | 85 | — | — |
| | | Toner binder (C'-5) | — | — | — | — | 85 | — |
| | | Toner binder (C'-6) | — | — | — | — | — | 85 |
| | Pigment | Carbon black MA-100 | 8 | 8 | 8 | 8 | 8 | 8 |
| | Charge control agent | T-77 | 2 | 2 | 2 | 2 | 2 | 2 |
| | Release agent | Carnauba wax | 4 | 4 | 4 | 4 | 4 | 4 |
| | Fluidizer | Aerosil R972 | 1 | 1 | 1 | 1 | 1 | 1 |
| Results of properties | Low-temperature fixability (° C.) | | 105 | 105 | 130 | 90 | 105 | 105 |
| | Hot offset resistance (° C.) | | 180 | 180 | 200 | 150 | 180 | 190 |
| | Grindability (μm) | | 6.6 | 6.7 | 5.9 | 8.1 | 6.7 | 6.5 |
| | Image strength | | H | B | HB | B | B | H |
| | Heat-resistant storage stability | | Fair | Poor | Good | Good | Poor | Fair |
| | Electrostatic charge stability | | 0.8 | 0.8 | 0.9 | 0.7 | 0.7 | 0.5 |
| | Goss-imparting properties | | 16% | 17% | 12% | 21% | 20% | 15% |
| | Durability | | Fair | Poor | Good | Good | Fair | Good |

As is clear from the evaluation results in Tables 5 and 6, the toners (T-1) to (T-19) of Examples 19 to 37 obtained using the toner binder of the present invention showed excellent results in all the properties evaluated. The toners of Comparative Examples 7 to 12 showed poor results in some of the properties. Comparative Example 7 showed poor heat-resistant storage stability and durability. Comparative Example 8 showed poor heat-resistant storage stability, image strength, and durability. Comparative Example 9 showed poor low-temperature fixability and gloss-imparting properties. Comparative Example 10 showed poor hot offset resistance, grindability, and image strength. Comparative Example 11 showed poor image strength, heat-resistant storage stability, and durability. Comparative Example 12 showed poor heat-resistant storage stability and electrostatic charge stability.

INDUSTRIAL APPLICABILITY

The toner binder of the present invention maintains low-temperature fixability and hot offset resistance while having excellent grindability, image strength, heat-resistant storage stability, electrostatic charge stability, gloss-imparting properties, and durability. The toner binder can be suitably used as a toner binder for developing electrostatic images in processes such as electrographic printing, electrostatic recording, and electrostatic printing.

The toner binder is also suitably applicable as an additive for coating materials, an additive for adhesives, and particles for electronic paper.

The invention claimed is:

1. A toner binder comprising:
an amorphous resin (A); and
a crystalline vinyl resin (B),
wherein the crystalline vinyl resin (B) is a polymer containing a monomer (a) as a constituent monomer, the monomer (a) being a C21-C40 (meth)acrylate having an acyclic hydrocarbon group,
wherein a weight percent of the monomer (a) based on the total weight of monomers constituting the crystalline vinyl resin (B) is 40 wt % or more and 80 wt % or less,
wherein the crystalline vinyl resin (B) has an acid value of 60 mg KOH/g or less,
wherein a weight ratio [(A)/(B)] of the amorphous resin (A) to the crystalline vinyl resin (B) is 81/19 to less than 95/5,
wherein the toner binder has an endothermic peak top temperature (Tm) derived from the crystalline vinyl resin (B) of 40° C. to 100° C. and a half-width of the endothermic peak derived from the crystalline vinyl resin (B) of 6° C. or less,
and
wherein the toner binder satisfies the following relation (1):

$$3° C. \leq Tfb(A) - Tfb(C) \leq 30° C., \text{ and}$$

wherein
Tm is the endothermic peak top temperature derived from the crystalline vinyl resin (B) during second heating on a DSC curve obtained by heating the toner binder in a differential scanning calorimeter from 20° C. to 150° C. at 10° C./min for first heating, cooling from 150° C. to 0° C. at 10° C./min, and then heating from 0° C. to 150° C. at 10° C./min for the second heating;

Tfb(C) in the relation (1) is the temperature at which the toner binder starts to flow while 1 g of the toner binder used as a sample is heated from 40° C. at 6° C./min with a load of $196.133 \times 10^4$ Pa to measure the outflow of the melted toner binder using a Koka-type flow tester with a die having a diameter of 1 mm and a length of 1 mm; and Tfb(A) is the temperature at which the amorphous resin (A) starts to flow while 1 g of the amorphous resin (A) used as a sample is measured under the same conditions as Tfb(C).

2. The toner binder according to claim 1,
wherein an amount of endothermic heat Q1 based on the endothermic peak derived from the crystalline vinyl resin (B) during the second heating in the differential scanning calorimeter is 15 J/g or less.

3. The toner binder according to claim 1,
wherein the crystalline vinyl resin (B) has a weight average molecular weight of 3000 to 200000.

4. The toner binder according to claim 1,
wherein the toner binder satisfies the following relation (2):

$$0.3(cal/cm^3)^{0.5} \leq |SP(A) - SP(B)| \leq 2.5(cal/cm^3)^{0.5}$$

wherein SP(A) is a solubility parameter (SP value) of the amorphous resin (A), and SP(B) is an SP value of the crystalline vinyl resin (B).

5. The toner binder according to claim 1,
wherein the amorphous resin (A) is an amorphous polyester resin (A1) and has an SP value of 10.7 to 11.9 $(cal/cm^3)^{0.5}$.

* * * * *